(12) United States Patent
Kim et al.

(10) Patent No.: US 10,209,686 B2
(45) Date of Patent: Feb. 19, 2019

(54) FLIGHT SIMULATION AND CONTROL METHOD OF A UNMANNED AERIAL VEHICLE WITH REGENERATIVE FUEL CELLS AND SOLAR CELLS FOR HIGH ALTITUDE LONG ENDURANCE, AND A CONTROL APPARATUS THEREOF

(71) Applicant: KOREA INSTITUTE OF ENERGY RESEARCH, Daejeon (KR)

(72) Inventors: Minjin Kim, Daejeon (KR); Young-jun Sohn, Daejeon (KR); Seung-gon Kim, Daejeon (KR); Gu-gon Park, Daejeon (KR); Byungchan Bae, Daejeon (KR); Sung-dae Yim, Daejeon (KR); Seok-hee Park, Daejeon (KR); Tae-hyun Yang, Daejeon (KR); Won-yong Lee, Daejeon (KR); Chang-soo Kim, Incheon (KR)

(73) Assignee: Korea Institute of Energy Research, Daejeon (KR)

( * ) Notice: Subject to any disclaimer, the term of this patent is extended or adjusted under 35 U.S.C. 154(b) by 44 days.

(21) Appl. No.: 15/436,523

(22) Filed: Feb. 17, 2017

(65) Prior Publication Data
US 2017/0322524 A1    Nov. 9, 2017

(30) Foreign Application Priority Data
Feb. 17, 2016    (KR) .................. 10-2016-0018545

(51) Int. Cl.
*B64C 39/00*    (2006.01)
*G05B 13/04*    (2006.01)
(Continued)

(52) U.S. Cl.
CPC .......... *G05B 13/048* (2013.01); *B64C 39/024* (2013.01); *G05D 1/0005* (2013.01);
(Continued)

(58) Field of Classification Search
CPC ............ B64C 39/00; B64D 33/00; B64B 1/06
(Continued)

(56) References Cited

U.S. PATENT DOCUMENTS 8,897,770 B1 * 11/2014 Frolov .................. H04W 84/06
244/25
9,139,279 B2 * 9/2015 Heppe ..................... B64C 37/02
(Continued)

FOREIGN PATENT DOCUMENTS

KR    1020120109563 A    10/2012

OTHER PUBLICATIONS

Kim, C. et al., "Design Parameter Sensitivity Analyses of a Solar Powered High Altitude Long Endurance Unmanned Aerial Vehicle," Proceedings of the 2014 Conference of the Korean Society for Aeronautical & Space Sciences, vol. 2014, No. 11, Nov. 2014, 4 pages. (See English Abstract on First Page).
(Continued)

*Primary Examiner* — Thomas G Black
*Assistant Examiner* — Wae L Louie
(74) *Attorney, Agent, or Firm* — McCoy Russell LLP

(57) ABSTRACT

Provided are a flight simulation and control method of a unmanned aerial vehicle with regenerative fuel cells and solar cells for high altitude long endurance, and a control apparatus thereof. The high altitude long endurance simulation method for an unmanned aerial vehicle based on regenerative fuel cells and solar cells includes: a variable inputting step of inputting design variables of the unmanned aerial vehicle based on regenerative fuel cells and solar cells; a modeling step of performing modeling of the unmanned aerial vehicle based on regenerative fuel cells and solar cells using the design variables input in the variable inputting step; and an analyzing step of analyzing a modeling result in the modeling step to perform a high altitude
(Continued)

long endurance simulation while controlling any one of the design variables input in the variable inputting step.

17 Claims, 13 Drawing Sheets

(51) Int. Cl.
*B64C 39/02* (2006.01)
*G05D 1/00* (2006.01)

(52) U.S. Cl.
CPC ........ *G05D 1/0022* (2013.01); *B64C 2201/02* (2013.01); *B64C 2201/042* (2013.01); *B64C 2201/06* (2013.01); *Y02A 90/16* (2018.01)

(58) Field of Classification Search
USPC ............. 701/7, 490; 455/431; 244/123.1, 24
See application file for complete search history.

(56) References Cited

U.S. PATENT DOCUMENTS

| | | | |
|---|---|---|---|
| 9,623,949 B2* | 4/2017 | Heppe | B64B 1/00 |
| 2006/0284003 A1* | 12/2006 | Chu | B64B 1/14 |
| | | | 244/24 |
| 2009/0026316 A1* | 1/2009 | Miller | B64C 39/024 |
| | | | 244/123.1 |
| 2016/0031564 A1* | 2/2016 | Yates | B64D 33/00 |
| | | | 307/9.1 |
| 2017/0175531 A1* | 6/2017 | Beckman | F01D 5/141 |

OTHER PUBLICATIONS

Nam, Y. et al., "A research for Energy Harvest/Distribution/Control of HALE UAV based on Solar Energy," Proceeding of the 2014 KSPE Fall Conference, Dec. 2014, Gangwon, Korea, 7 pages. (See English Abstract on First Page).

\* cited by examiner

FLIGHT SIMULATION AND CONTROL METHOD OF A UNMANNED AERIAL VEHICLE WITH REGENERATIVE FUEL CELLS AND SOLAR CELLS FOR HIGH ALTITUDE LONG ENDURANCE, AND A CONTROL APPARATUS THEREOF

CROSS-REFERENCE TO RELATED APPLICATIONS

This application claims priority under 35 U.S.C. § 119 to Korean Patent Application No. 10-2016-0018545, filed on Feb. 17, 2016, in the Korean Intellectual Property Office, the entire disclosure of which is incorporated herein by reference in its entirety for all purposes.

TECHNICAL FIELD

The following disclosure relates to a flight simulation and control method of a unmanned aerial vehicle with regenerative fuel cells and solar cells for high altitude long endurance, and a control apparatus thereof. More particularly, the following disclosure relates to a high altitude (stratospheric) long endurance simulation method for an unmanned aerial vehicle (UAV) based on regenerative fuel cells and solar cells capable of performing simulation for deciding whether or not high altitude (stratospheric) long endurance of the unmanned aerial vehicle based on regenerative fuel cells and solar cells is possible.

BACKGROUND

A stratospheric long endurance hybrid unmanned aerial vehicle (UAV) may perform civil duties such as meteorological observation, aerial shot, communication relay, disaster observation, Internet network construction, and the like, as well as military duties such as wider monitoring and reconnaissance at an altitude higher than that of an existing aircraft operated at the atmosphere. In addition, since the stratospheric long endurance hybrid unmanned aerial vehicle is operated at an altitude lower than that of an artificial satellite, maintenance and management of the stratospheric long endurance hybrid unmanned aerial vehicle are easy, and data loss and delay may be minimized.

Since a meteorological change is not substantially present in the stratosphere unlike the atmosphere, stability, which is one of the most importable elements in operating an aircraft, may be secured in the stratosphere. In addition, since a larger amount of solar energy may be obtained in the stratosphere than in the atmosphere, a solar cell system constituting a hybrid unmanned aerial vehicle may generate a larger amount of power in the stratosphere.

Therefore, in the case in which the unmanned aerial vehicle is operated in the stratosphere, duty efficiency may be improved, such that a service may be continuously provided.

Several study teams all over the world have developed an unmanned aerial vehicle in which a hybrid system is used. The National Aeronautics and Space Administration (NASA) has developed Pathfinder series and Helios, which are high altitude long endurance hybrid unmanned aerial vehicles, in ERAST Project up to 2003. These unmanned aerial vehicles use a hybrid system of a solar cell, a battery, and a fuel cell, and the like, to aim to be flown at an altitude of about 15 km to 30 km (50000 ft to 100000 ft) for at least twenty four hours. The Pathfinder-Plus has a total weight of 315 kg and a wing area of 87.12 $m^2$ and has arrived at an altitude of about 24 km (80000 ft), and the Helios has a total weight of 929 kg and a wing area of 183.58 $m^2$ and has arrived at an altitude of about 29.5 km (96863 ft).

The Thales Alenia Space has developed StratoBus, which is a high altitude long endurance hybrid unmanned aerial vehicle having an airship form. This airship uses a hybrid system of a solar cell, a battery, a proton exchange membrane fuel cell (PEMFC), and a water electrolyzer to aim to stay in the sky of 20 km for long endurance such as five years or more.

The Boeing has developed Solar Eagle capable of staying in the sky of 20 km for long endurance such as five years or more by using a hybrid system of a solar cell, a solid oxide fuel cell (SOFC), and a water electrolyzer.

The Zephyr of the Qinetiq has used a hybrid system of a solar cello and an Li—S battery to arrive at an altitude of 21.562 km on July, 2010 and achieve a long endurance record of 336 hours and 22 minutes.

However, in spite of the development of the stratospheric long endurance hybrid unmanned aerial vehicles described above, there are still issues that should be solved for the purpose of long endurance operation of the stratospheric long endurance hybrid unmanned aerial vehicles in the stratosphere.

First, it is impossible to additionally supply fuel to the unmanned aerial vehicle in the stratosphere, and in the case of using a solar cell system, power may not be generated during the night in which solar energy is not present. Therefore, an auxiliary power system is necessarily required. In addition, the stratospheric long endurance unmanned aerial vehicle should be able to ensure extreme conditions such as a very low temperature of 56.5° C. below zero, a strong ultraviolet ray, a low air density, and the like. Particularly, since lift force of the unmanned aerial vehicle is smaller in the stratosphere than in the atmosphere under a low air density condition, the unmanned aerial vehicle should be manufactured at a very light weight or a wing area of the unmanned aerial vehicle should be increased, in order to fly the unmanned aerial vehicle in the stratosphere.

To this end, in a high altitude long endurance simulation method for an unmanned aerial vehicle based on regenerative fuel cells and solar cells according to an exemplary embodiment of the present invention, a hybrid system of regenerative fuel cells and solar cells has been used in an unmanned aerial vehicle.

Hydrogen and oxygen may be generated using surplus energy remaining after a solar cell system supplies output power required by the unmanned aerial vehicle to the unmanned aerial vehicle during the daytime through a water electrolysis system of the regenerative fuel cells, and power may be generated using the hydrogen and the oxygen generated during the daytime through a fuel cell system of the regenerative fuel cells during the night in which the solar cell system may not be operated. Water generated through an electrochemical reaction in the fuel cells is used to generate the hydrogen and the oxygen through electrolysis in a water electrolysis stack. Therefore, the unmanned aerial vehicle using a hybrid system of the regenerative fuel cells and the solar cells according to an exemplary embodiment of the present invention does not require the additional supply of fuel, such that it may be a good solution for solving the problems described above.

In addition, specific energy of the regenerative fuel cell system is 400 to 1000 Wh/kg, which is higher than 240 Wh/kg corresponding to specific energy of a lithium-ion battery system. This means that the regenerative fuel cell system is lighter than the lithium-ion battery system in providing the same energy.

Therefore, in the case in which the regenerative fuel cells are used in the unmanned aerial vehicle, the unmanned aerial vehicle may be manufactured at a weight lighter than that of an unmanned aerial vehicle using a battery.

However, in a regenerative fuel cell system of a current technical level, a technical difficulty for manufacturing the regenerative fuel cell system at a very light weight is high, and hydrogen/oxygen generation efficiency of a water electrolyzer is low, such that it is very difficult to achieve a long endurance duty.

Therefore, in the high altitude long endurance simulation method for an unmanned aerial vehicle based on regenerative fuel cells and solar cells according to an exemplary embodiment of the present invention, in order to search a target value of a technical level for achieving a high altitude long endurance target of the unmanned aerial vehicle, specific design variables having an influence on endurance capacitance of the unmanned aerial vehicle are set, and a simulation is performed while controlling the respective specific design variables to analyze influences of the design variables on a flight time, thereby making it possible to provide target values of the design variables required for a long endurance operation.

Meanwhile, Korean Patent Laid-Open Publication No. 10-2012-0109563 (entitled "High Altitude Long Endurance Unmanned Aircraft and Methods of Operation Thereof" and hereinafter referred to as Related Art Document 1) has disclosed a high altitude long endurance unmanned aerial vehicle having high altitude base station maintaining capability, but does not mention the problems described above and a method for solving the problems described above at all.

RELATED ART DOCUMENT

Patent Document

Korean Patent Laid-Open Publication No. 10-2012-0109563 (published on Oct. 8, 2012)

SUMMARY

An embodiment of the present invention is directed to providing a high altitude (stratospheric) long endurance simulation method for an unmanned aerial vehicle (UAV) based on regenerative fuel cells and solar cells capable of performing simulation for deciding whether or not high altitude (stratospheric) long endurance of the unmanned aerial vehicle based on regenerative fuel cells and solar cells is possible.

In one general aspect, a high altitude long endurance simulation method for an unmanned aerial vehicle based on regenerative fuel cells and solar cells, configured in a program form executed by an arithmetic processing means including a computer includes: a variable inputting step (S100) of inputting design variables of the unmanned aerial vehicle based on regenerative fuel cells and solar cells; a modeling step (S200) of performing modeling of the unmanned aerial vehicle based on regenerative fuel cells and solar cells using the design variables input in the variable inputting step (S100); and an analyzing step (S300) of analyzing a modeling result in the modeling step (S200) to perform a high altitude long endurance simulation while controlling any one of the design variables input in the variable inputting step (S100).

In the variable inputting step (S100), a weight of the unmanned aerial vehicle, a wing area of the unmanned aerial vehicle, and water electrolysis performance of the regenerative fuel cells may be set as the design variables of the unmanned aerial vehicle based on regenerative fuel cells and solar cells.

In the modeling step (S200), output power and required energy of the unmanned aerial vehicle may be calculated using the weight, lift force, a minimum speed, thrust force of the unmanned aerial vehicle, and drag force acting on the unmanned aerial vehicle, a preset range of the wing area of the unmanned aerial vehicle may be set to an area of the solar cells to calculate output power of the solar cells and energy generated by the solar cells, a cell voltage of fuel cells included in the regenerative fuel cells may be set to calculate energy generated by the fuel cells, amounts of hydrogen and oxygen consumed through the fuel cells, and an amount of water generated through the fuel cells, and energy transferred to a water electrolyzer included in the regenerative fuel cells may be set to calculate amounts of hydrogen and oxygen generated through the water electrolyzer and an amount of water consumed through the water electrolyzer, thereby performing the modeling of the unmanned aerial vehicle based on regenerative fuel cells and solar cells.

In the analyzing step (S300), the modeling result in the modeling step (S200) may be analyzed to perform the high altitude long endurance simulation while controlling the other design variables to be changed after any one of the weight of the unmanned aerial vehicle, the wing area of the unmanned aerial vehicle, and the water electrolysis performance of the regenerative fuel cells corresponding to the design variables is controlled to be fixed.

The high altitude long endurance simulation method for an unmanned aerial vehicle based on regenerative fuel cells and solar cells may further include a validity verifying step (S400) of analyzing a high altitude long endurance simulation performing result for the unmanned aerial vehicle based on regenerative fuel cells and solar cells performed in the analyzing step (S300) to decide whether or not high altitude long endurance of the unmanned aerial vehicle based on regenerative fuel cells and solar cells is possible.

DETAILED DESCRIPTION OF MAIN ELEMENTS

Figure 1:
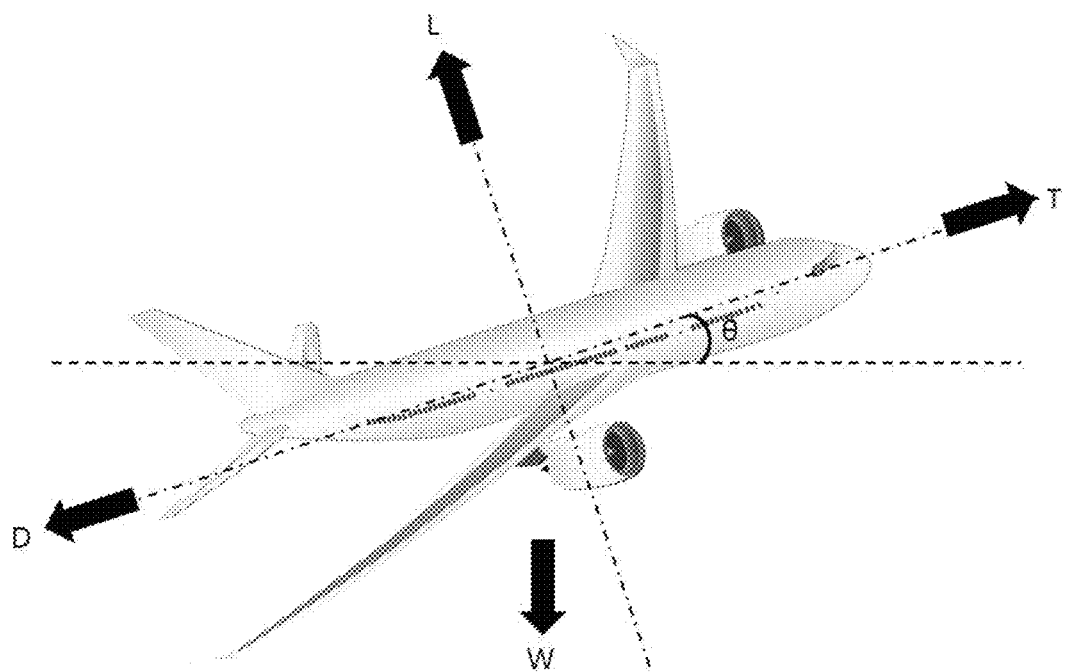
FIG. 1 is an illustrative view illustrating various kinds of force acting on an unmanned aerial vehicle based on regenerative fuel cells and solar cells according to an exemplary embodiment of the present invention.

S100 to S400: respective steps of high altitude long endurance simulation method for unmanned aerial vehicle based on regenerative fuel cells and solar cells according to an exemplary embodiment of the present invention S1100 to S1400: respective steps of flight control method for high altitude long endurance of unmanned aerial vehicle based on regenerative fuel cells and solar cells according to an exemplary embodiment of the present invention 10: flight control apparatus
20: inputting unit
30: required energy calculating unit
40: calculating unit
50: controlling unit
100: aircraft

DETAILED DESCRIPTION OF EMBODIMENTS

Hereinafter, a high altitude long endurance simulation method for an unmanned aerial vehicle based on regenerative fuel cells and solar cells according to an exemplary embodiment of the present invention will be described in detail with reference to the accompanying drawings. The accompanying drawings to be provided below are provided by way of example so that the idea of the present invention can be sufficiently transferred to those skilled in the art to which the present invention pertains. Therefore, the present invention is not limited to the accompanying drawings to be provided below, but may be implemented in other forms. In addition, like reference numerals denote like elements throughout the specification.

Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

The stratosphere has stable atmosphere and may obtain solar energy more than solar energy that may be obtained in the atmosphere, such that when an unmanned aerial vehicle is flown in the stratosphere, flight stability and duty efficiency are improved. However, problems that a climate is severely cold and it is impossible to additionally supply fuel should be solved in order to operate the unmanned aerial vehicle in the stratosphere.

In order to solve these problems, a weight of the unmanned aerial vehicle should be minimized and performance of an output power system of the unmanned aerial vehicle should be improved.

A regenerative fuel cell system may operate a water electrolysis system using surplus energy of solar cells during the daytime to generate and store hydrogen and oxygen, and may operate fuel cells using the hydrogen and the oxygen during the night in which the solar cells may not be used to provide required output power to the unmanned aerial vehicle. As a result, the problem of the additional supply of the fuel described above may be solved.

In addition, specific energy of the regenerative fuel cell system is 400 to 1000 Wh/kg, which is higher than 240 Wh/kg corresponding to specific energy of a lithium-ion battery system. Therefore, in the case of assuming that the regenerative fuel cell system and the lithium-ion battery system supply the same energy, the regenerative fuel cell system is lighter than the lithium-ion battery system.

However, since it is difficult to mount a regenerative fuel cell system of a current technical level directly in the unmanned aerial vehicle to use the regenerative fuel cell system for a high altitude long endurance duty, it may be decided whether or not high altitude (stratospheric) long endurance of a hybrid unmanned aerial vehicle based on regenerative fuel cells and solar cells is possible through a high altitude long endurance simulation method for an unmanned aerial vehicle based on regenerative fuel cells and solar cells according to an exemplary embodiment of the present invention.

In the high altitude long endurance simulation method for an unmanned aerial vehicle based on regenerative fuel cells and solar cells according to an exemplary embodiment of the present invention, it may be confirmed that high altitude long endurance of the unmanned aerial vehicle based on regenerative fuel cells and solar cells is possible in the case of modeling specific design variables to control a design condition, in order to investigate validity of the high altitude long endurance of the hybrid unmanned aerial vehicle based on regenerative fuel cells and solar cells at 18 km, which is a target altitude.

Figure 2:
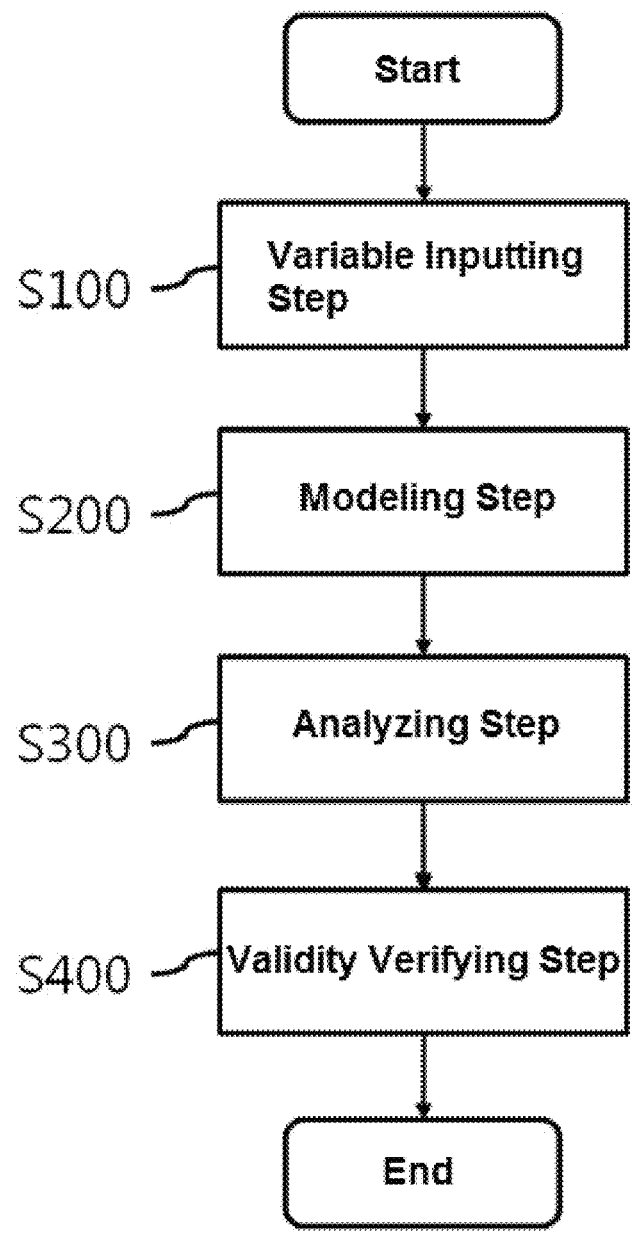
FIG. 2 is a flow chart illustrating a high altitude long endurance simulation method for an unmanned aerial vehicle based on regenerative fuel cells and solar cells according to an exemplary embodiment of the present invention.

FIG. 2 is a flow chart illustrating a high altitude long endurance simulation method for an unmanned aerial vehicle based on regenerative fuel cells and solar cells according to an exemplary embodiment of the present invention. The high altitude long endurance simulation method for an unmanned aerial vehicle based on regenerative fuel cells and solar cells according to an exemplary embodiment of the present invention according to an exemplary embodiment of the present invention will be described in detail with reference to FIG. 2.

The high altitude long endurance simulation method for an unmanned aerial vehicle based on regenerative fuel cells and solar cells according to an exemplary embodiment of the present invention may include a variable inputting step (S100), a modeling step (S200), and an analyzing step (S300), and may be configured in a program form executed by an arithmetic processing means including a computer.

The respective steps will be described in detail. In the variable inputting step (S100), design variables of the unmanned aerial vehicle based on regenerative fuel cells and solar cells may be input, and a weight of the unmanned aerial vehicle, a wing area of the unmanned aerial vehicle, and water electrolysis performance of the regenerative fuel cells may be input as the design variables.

The weight of the unmanned aerial vehicle has an influence on required output power of the unmanned aerial vehicle to have an influence on amounts of used hydrogen and oxygen.

The wing area of the unmanned aerial vehicle has an influence on lift force and an area of the solar cell. The lift force has an influence on the required output power of the unmanned aerial vehicle, and the area of the solar cell has an influence on energy supplied to the unmanned aerial vehicle and energy supplied to a water electrolysis system to have an influence on amounts of hydrogen and oxygen generated through the water electrolysis system.

Since energy supplied to a water electrolyzer for one day through solar cells is limited, water electrolysis performance (required energy per unit hydrogen/oxygen generation weight) of the regenerative fuel cells of the unmanned aerial vehicle has an influence on entire amounts of generated hydrogen and oxygen.

As described above, since the specific design variables may have a large influence on a flight time of the unmanned aerial vehicle based on regenerative fuel cells and solar cells, it is preferable to set the specific design variable as design variables.

Here, in FIG. 1, which is a view illustrating various kinds of force acting on an unmanned aerial vehicle, L refers to lift force acting on the unmanned aerial vehicle, T refers to thrust force of the unmanned aerial vehicle, W refers to a weight of the unmanned aerial vehicle, D refers to drag force acting on the unmanned aerial vehicle.

The following Table 1 is the international standard atmosphere table representing an air density, a gravitational acceleration, a temperature, and a viscosity depending on a flight altitude, and the following Table 2 is a table representing parameters for performing modeling calculation in the modeling step (S200).

TABLE 1

| Altitude (km) | Air density (kg/m$^3$) [ρ] | Gravitational Acceleration (m/s$^2$) [g] | Temperature (K) [T] | Viscosity (kg/(m * s)) [μ] |
|---|---|---|---|---|
| 0 | 1.225 | 9.806825175 | 288.15 | 1.78938E−05 |
| 1 | 1.112 | 9.803725072 | 281.65 | 1.75785E−05 |
| 2 | 1.007 | 9.80062827 | 275.15 | 1.72596E−05 |
| 3 | 0.909 | 9.797534667 | 268.65 | 1.69372E−05 |
| 4 | 0.819 | 9.794444159 | 262.15 | 1.66111E−05 |
| 5 | 0.736 | 9.791356643 | 255.65 | 1.62812E−05 |
| 6 | 0.66 | 9.788272019 | 249.15 | 1.59474E−05 |
| 7 | 0.59 | 9.785190182 | 242.75 | 1.56148E−05 |
| 8 | 0.526 | 9.78211103 | 236.25 | 1.5273E−05 |
| 9 | 0.467 | 9.779034462 | 229.75 | 1.49269E−05 |
| 10 | 0.413 | 9.775960373 | 223.25 | 1.45765E−05 |
| 11 | 0.365 | 9.772888662 | 216.75 | 1.42216E−05 |
| 12 | 0.312 | 9.769819226 | 216.65 | 1.42161E−05 |
| 13 | 0.267 | 9.766751963 | 216.65 | 1.42161E−05 |
| 14 | 0.228 | 9.763686769 | 216.65 | 1.42161E−05 |
| 15 | 0.195 | 9.760623543 | 216.65 | 1.42161E−05 |
| 16 | 0.166 | 9.757562182 | 216.65 | 1.42161E−05 |
| 17 | 0.142 | 9.754502583 | 216.65 | 1.42161E−05 |
| 18 | 0.122 | 9.751444643 | 216.65 | 1.42161E−05 |

TABLE 2

| Character | Description | value | Unit |
|---|---|---|---|
| Parameter of Wing | | | |
| — | Airfoil | NACA6412 | — |
| AR | Aspect ratio | 20~22 | — |
| $L_C$ | Chord | 1.5~3.5 | m |
| Parameter of Unmanned Aerial Vehicle | | | |
| θ | Climb Angle | 10 | degree |
| $\eta_{prop}$ | Propeller Efficiency | 0.85 | — |
| $\eta_{motor}$ | Motor Efficiency | 0.92 | — |
| Parameter of Solar Cell | | | |
| $\eta_{PV}$ | Solar Cell Efficiency | 0.18 | — |
| $\eta_{EF}$ | Power Generation Efficiency Due to Environmental Factor | 0.70 | — |

In the modeling step (S200), modeling of the unmanned aerial vehicle based on regenerative fuel cells and solar cells may be performed using the design variables input in the variable inputting step (S100).

In detail, in the modeling step (S200), output power and required energy of the unmanned aerial vehicle are calculated using a weight W of the unmanned aerial vehicle, lift force L acting on the unmanned aerial vehicle, a minimum speed v of the unmanned aerial vehicle, thrust force T of the unmanned aerial vehicle, and drag force D acting on the unmanned aerial vehicle, a preset range of a wing area of the unmanned aerial vehicle is set to an area of solar cells to calculate output power of the solar cells and energy generated by the solar cells, a cell voltage of fuel cells included in the regenerative fuel cells is set to calculate energy generated by the fuel cells, amounts of hydrogen and oxygen consumed through the fuel cells, and an amount of water generated through the fuel cells, and energy transferred to a water electrolyzer included in the regenerative fuel cells is set to calculate amounts of hydrogen and oxygen generated through the water electrolyzer and an amount of water consumed through the water electrolyzer, thereby making it possible to perform the modeling of the unmanned aerial vehicle based on regenerative fuel cells and solar cells.

In detail, the modeling of the unmanned aerial vehicle based on regenerative fuel cells and solar cells may be performed using basic equations of aerodynamics.

The modeling may be performed on the basis of the parameters represented in the above Tables 1 and 2.

The weight W of the unmanned aerial vehicle may be calculated through the following Equation:

$$W = mg.$$

Since the lift force L of the unmanned aerial vehicle is associated with the weight of the unmanned aerial vehicle, the lift force may be calculated through the following Equation:

$$L = W \cos(\theta).$$

The minimum speed v of the unmanned aerial vehicle may be calculated through the following Equation:

$$v = \sqrt{\frac{2W}{\rho A_{wing} C_L}}.$$

(Here, W: weight, N,
m: mass, kg,
g: gravitational acceleration, m/s$^2$,
$A_{wing}$: area, m$^2$,
ρ: air density, kg/(m*s),
$C_L$: lift coefficient,
L: lift force, N,
v: minimum velocity, m/s)

The drag force D acting on the unmanned aerial vehicle may be calculated through the following Equation:

$$D = \frac{\rho v^2 A_{wing} C_D}{2}.$$

(Here, D: drag force, N,
$C_D$: drag coefficient)

Since the thrust force T of the unmanned aerial vehicle is associated with the weight and the drag force of the unmanned aerial vehicle, the thrust force may be calculated through the following Equation:

$$T = W \sin(\theta) + D.$$

(Here, T: thrust force, N)

Therefore, the output power of the unmanned aerial vehicle based on regenerative fuel cells and solar cells may be calculated. The output power $P_{UAV}$ of the unmanned aerial vehicle based on regenerative fuel cells and solar cells may be calculated through the following Equation:

$$P_{UAV} = \frac{Tv}{n_{prop} n_{motor}}.$$

(Here, $P_{UAV}$: output power of a UAV considering efficiencies, W,

Tυ: thrust force, N,
$n_{prop}$: propeller efficiency,
$L_{motor}$: motor efficiency)

Therefore, the energy $E_{UAV}$ required by the unmanned aerial vehicle based on regenerative fuel cells and solar cells may be calculated through following Equation:

$$E_{UAV} = \int_{t1}^{tn} P_{UAV} dt.$$

(Here, $E_{UAV}$: output energy of a UAV, Wh)

It is preferable to set the area of the solar cells included in the unmanned aerial vehicle based on regenerative fuel cells and solar cells in relation to the wing area of the unmanned aerial vehicle, and it is preferable to set the area of the solar cells in the present invention to 75% of the wing area of the unmanned aerial vehicle.

Figure 3:
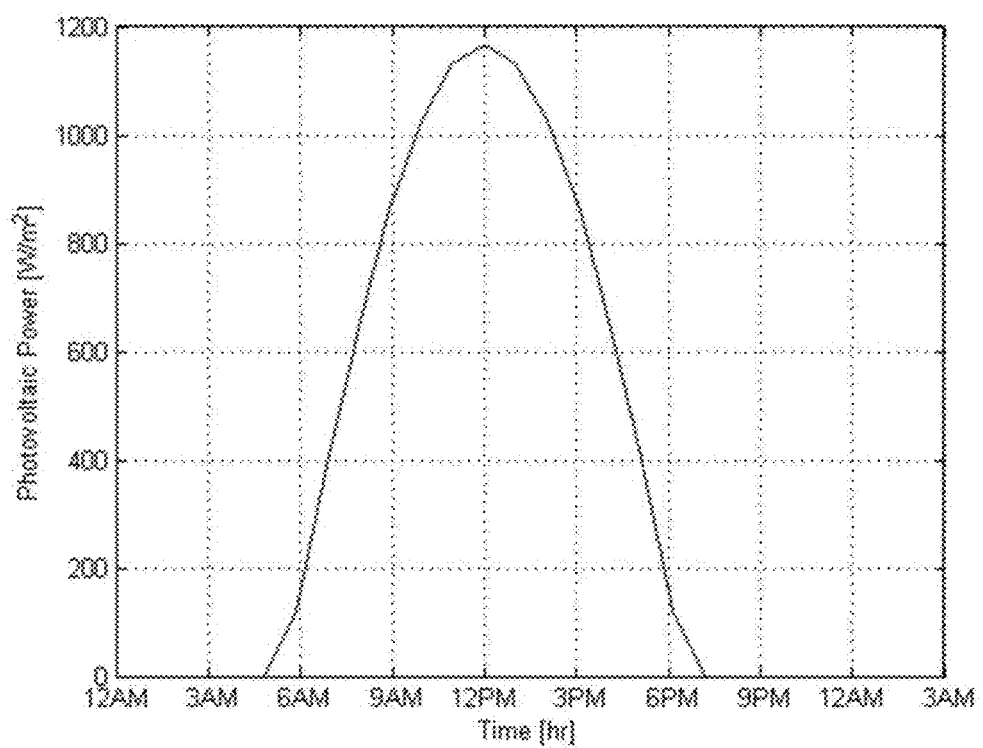
FIG. 3 is a view illustrating output power per unit area of solar cells formed in a wing of an unmanned aerial vehicle based on regenerative fuel cells and solar cells according to an exemplary embodiment of the present invention, depending on a time.

FIG. 3 is a view illustrating an output power value $P_{PVA}$ per unit area of solar cells depending on a time. By reflecting the area and the efficiency of the solar cells, the output power $P_{PV}$ of the solar cells included in the unmanned aerial vehicle based on regenerative fuel cells and solar cells may be calculated through the following Equation:

$$P_{PV} = 0.75 P_{PVA} A_{wing} n_{EF}.$$

(Here, $P_{PV}$: power considering the area of the PV cells and their efficiency, W,
$n_{EF}$: efficiency according to environmental factors)

Energy $E_{PV}$ generated by the solar cells included in the unmanned aerial vehicle based on regenerative fuel cells and solar cells may be calculated through the following Equation:

$$E_{PV} = \int_{t1}^{t2} P_{PV} dt.$$

(Here, $E_{PV}$: total generated energy from PV cells, Wh)

It is preferable to set a fuel cell system included in the regenerative fuel cells included in the unmanned aerial vehicle based on regenerative fuel cells and solar cells to a 2.5 kW level proton exchange membrane fuel cell (PEMFC), and it is preferable to operate a fuel cell stack in a dead-end type, set the number of cells to 40, and set an activation area to 60 cm$^2$.

Figure 4:
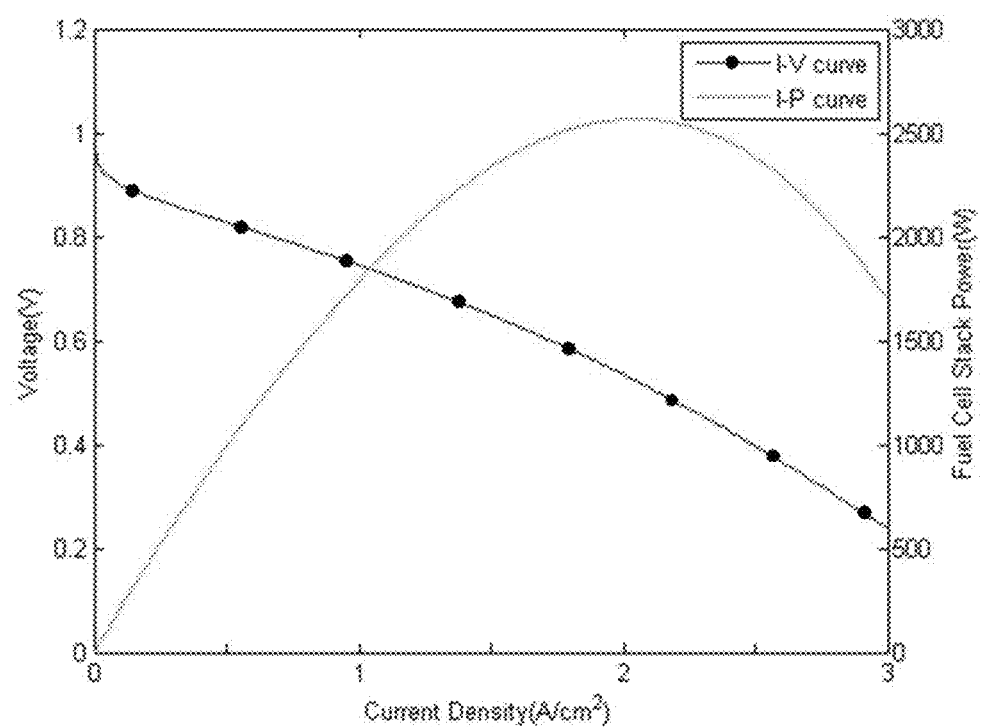
FIG. 4 is a view illustrating performance curves of a fuel cell module of an unmanned aerial vehicle based on regenerative fuel cells and solar cells according to an exemplary embodiment of the present invention.

FIG. 4 is a view illustrating performance curves of a fuel cell stack. As described above, the fuel cell stack may obtain maximum power of about 2.5 kW at a current density of 2.05 A/cm$^2$.

The following Table 3 is a table representing driving conditions of the fuel cells.

TABLE 3

| Character | Description | value | Unit |
| --- | --- | --- | --- |
| T | Temperature | 343 | K |
| $P_{SAT}$ | Vapor saturation pressure | 0.307 | atm |
| $P^C$ | Cathode pressure | 3 | atm |
| $P^A$ | Anode pressure | 3 | atm |
| $D^{eff}_{H2/H2O}$ | Effective hydrogen diffusivity | 0.149 | cm$^2$/s |
| $D^{eff}_{O2/H2O}$ | Effective oxygen diffusivity | 0.0295 | cm$^2$/s |
| $D_\lambda$ | Water diffusivity in Nafion | 3.81 * 10$^{-6}$ | cm$^2$/s |
| α | Transfer coefficient | 0.5 | — |
| $i_o$ | Exchange current density | 0.0001 | A/cm$^2$ |
| $t^M$ | Electrolyte thickness | 125 | μm |
| $t^A$ | Anode thickness | 350 | μm |
| $t^C$ | Cathode thickness | 350 | μm |

The cell voltage of the fuel cells may be obtained in consideration of an activation overpotential $n_{oct}$, an ohmic overpotential $n_{ohmic}$, and a concentration overpotential $n_{conc}$ in a thermodynamic equivalent potential $E_{thermo}$. Since anode activation loss is much smaller than cathode activation loss, even though the anode activation loss is ignored, it does not have an influence in calculating the cell voltage.

The cell voltage $V_{cell}$ of the fuel cells may be calculated through the following Equations:

$$V_{cell} = E_{thermo} - n_{act} - n_{ohmic} - n_{conc},$$

$$n_{act} = \frac{RT}{n\alpha F}\ln\frac{i}{i_o P^C\left(x_{O_2} - \frac{t^C i RT}{nFP^C D_{O_2 H_2O}^{eff}}\right)},$$

$$n_{ohmic} = i \times ASR_{ohmic}, \text{ and}$$

$$n_{conc} = \frac{RT}{nF}\ln\left(\frac{i_L}{i_L - i}\right).$$

(Here, $V_{cell}$: cell voltage, V,
$E_{thermo}$: thermodynamic equivalent potential, V,
$n_{act}$: Activation overpotential,
$n_{ohmic}$: Ohmic overpotential,
$n_{conc}$: Concentration overpotential,
R: gas constant, J/(mol*K),
T: temperature, ° C., K,
n: number of electrons,
α: transfer coefficient,
F: Faraday constant, C/mol,
$i_o$: Exchange current density, A/cm$^2$,
$P^C$: Cathode pressure, atm,
$t^C$: Cathode thickness,
$D^{eff}_{O_2/H_2O}$: Effective oxygen diffusivity cm$^2$/s.
i: current density, A/cm$^2$,
$ASR_{ohmic}$: area-specific resistance, Ω/cm$^2$,
$i_L$: limiting current density, A/cm$^2$).

Output power required by the unmanned aerial vehicle based on regenerative fuel cells and solar cells is supplied as output power of the fuel cell system included in the regenerative fuel cells, and the output power required by the unmanned aerial vehicle may be calculated through the following Equation:

$$P_{UAV} = P_{FC,sys} * n_{inverter}.$$

(Here, $P_{FC,sys}$: power generated from fuel cell system, W, $n_{inverter}$: efficiency of inverter)

The output power generated from the fuel cell system included in the regenerative fuel cells may be calculated through the following Equation:

$$P_{FC,sys} = P_{FC,stack} + P_{FC,BOP}.$$

(Here, $P_{FC,stack}$: power generated from fuel cell system, W,
$P_{FC,BOP}$: power of BOP of fuel cell, W)

Energy generated from the fuel cell stack may be calculated through the following Equation:

$$E_{FC,stack} = \int_{t_1}^{t_2} P_{FC,stack} dt$$

(Here, $E_{FC,stack}$: energy generated from fuel cell stack, Wh)

Amounts of hydrogen and oxygen consumed through the fuel cell system included in the regenerative fuel cells may be calculated through the following Equations:

$$m_{H_2,consumption} = 1.05 * 10^{-8} * (P_{FC,sys}/V_{cell}) * S_{H_2}, \text{ and}$$

$$m_{O_2,consumption} = 8.29 * 10^{-8} * (P_{FC,sys}/V_{cell}) * S_{O_2},$$

(Here, $m_{H_2,consumption}$: amount of hydrogen consumption, kg/h,
$m_{O_2,consumption}$: amount of oxygen consumption, kg/h)

An amount of water generated through an electrochemical reaction in the fuel cell system included in the regenerative fuel cells may be calculated through the following Equation:

$$m_{H_2O,generation} = m_{H_2,consumption} + m_{O_2,consumption},$$

(Here, $m_{H_2O, generation}$: amount of water generation, kg/h)

The output power obtained through the water electrolysis system included in the regenerative fuel cells included in the unmanned aerial vehicle based on regenerative fuel cells and solar cells may be calculated through the following Equation:

$$P_{PEL} = P_{PV} - P_{UAV}(P_{PV} > P_{UAV}).$$

(Here, $P_{PEL}$: power required by the WE system to generate gases, W)

The energy obtained through the water electrolysis system included in the regenerative fuel cells included in the unmanned aerial vehicle based on regenerative fuel cells and solar cells may be calculated through the following Equation:

$$E_{PEL} = \int_{t_1}^{t_2} P_{PEL} dt.$$

(Here, $E_{PEL}$: energy required by the WE system to generate gases, Wh)

Masses of hydrogen and oxygen generated in the water electrolysis system included in the regenerative fuel cells included in the unmanned aerial vehicle based on regenerative fuel cells and solar cells are defined as a ratio between energy supplied to the water electrolysis system and energy required for generating 1 kg of hydrogen and oxygen, and may be calculated and defined through the following Equations:

$$m_{H_2,generation} = E_{PEL}/E_{PEL,1 \, kg \, H_2}, \text{ and}$$

$$m_{O_2,generation} = E_{PEL}/E_{PEL,1 \, kg \, O_2}.$$

(Here, $m_{H_2,generation}$: amount of hydrogen generation, kg/h,
$E_{PEL, 1 \, kg \, H_2}$: water electrolysis performance, kWh/kg $H_2$,
$m_{O_2, generation}$: amount of oxygen generation, kg/h,
$E_{PEL, 1 \, kg \, O_2}$: water electrolysis performance, kWh/kg $O_2$)

An amount of water that the water electrolysis system included in the regenerative fuel cells included in the unmanned aerial vehicle based on regenerative fuel cells and solar cells consumes while performing electrolysis may be defined through the following Equation:

$$m_{H_2O, consumption} = m_{H_2,consumption} = m_{O_2,generation}.$$

(Here, $m_{H_2O, consumption}$: amount of water consumption, kg/h)

In the modeling step (S200), the modeling of the unmanned aerial vehicle based on regenerative fuel cells and solar cells may be performed using the above Equations.

In the analyzing step (S300), a modeling result in the modeling step (S200) may be analyzed. That is, a high altitude long endurance simulation may be performed while controlling any one of the design variables input in the variable inputting step (S100).

In detail, in the analyzing step (S300), the modeling result in the modeling step (S200) is analyzed to perform the high altitude long endurance simulation for the unmanned aerial vehicle based on regenerative fuel cells and solar cells while controlling the others of the weight of the unmanned aerial vehicle, the wing area of the unmanned aerial vehicle, and the water electrolysis performance of the regenerative fuel cells, which are the design variables input in the variable inputting step (S100), to be changed in a state in which any one of the weight of the unmanned aerial vehicle, the wing area of the unmanned aerial vehicle, and the water electrolysis performance of the regenerative fuel cells is fixed to a reference value.

In this case, in the high altitude long endurance simulation for the unmanned aerial vehicle based on regenerative fuel cells and solar cells according to an exemplary embodiment of the present invention, it is preferable to fix a climb angle of the unmanned aerial vehicle to 10 degrees, it is preferable to assume that an aspect ratio of a wing of the unmanned aerial vehicle is 20 to 22, a mounted area of the solar cells is 75% of the wing area, water is electrolyzed into pure hydrogen and oxygen through the water electrolysis system, hydrogen and oxygen are consumed while electrochemically reacting to each other through the fuel cell system to be changed into pure water.

In addition, it is preferable to set the unmanned aerial vehicle based on regenerative fuel cells and solar cells to take off in a state in which the unmanned aerial vehicle carries water enough to generate hydrogen and oxygen required for a level flight for one day, and it is preferable to define endurance for 50 hours (corresponding to a time exceeding two cycles (48 hours) when a flight time of one day (24 hours) is one cycle) or more as long endurance.

Controllable detailed ranges of the design variables input in the variable inputting step (S100) controlled in the analyzing step (S300) may be represented as illustrated in the following Table 4.

TABLE 4

| Design Variable | Character | Range | | | | |
|---|---|---|---|---|---|---|
| Weight (kg) of Unmanned Aerial Vehicle | W | 150 | 250 | 350 | 450 | 550 |
| Wing Area (m$^2$) | $A_{wing}$ | 50 | 100 | 150 | 200 | 250 |
| Water Electrolysis Performance (kWh/1 kg H$_2$) | $E_{PEL,1\ kg\ H_2}$ | 30 | 55 | 80 | 105 | 130 |

In the analyzing step (S300), it is preferable to set a reference value of the weight of the unmanned aerial vehicle for controlling setting to 350 kg, set a reference value of the wing area of the unmanned aerial vehicle for controlling setting to 150 m$^2$, and set a reference value of the water electrolysis performance of the regenerative fuel cells for controlling setting to 80 kWh/1 kg H$_2$, with reference to an existing research result for the weight of the unmanned aerial vehicle, the wing area of the unmanned aerial vehicle, and the water electrolysis performance of the regenerative fuel cells. Through this, in the analyzing step (S300), the high altitude long endurance simulation is performed while changing any one of the design variables input in the variable inputting step (S100) to various conditions on the basis of the reference values described above in a state in which the others of the design variables are fixed to the reference values described above, such that an accurate simulation may be performed.

Figure 5:
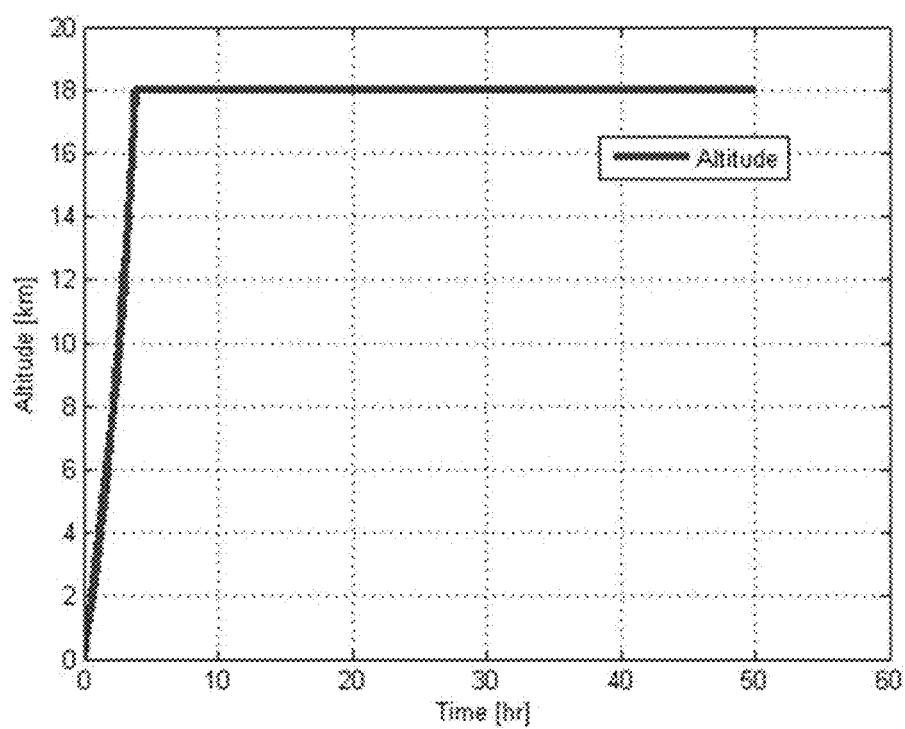
FIG. 5 is a view illustrating a flight path of an unmanned aerial vehicle based on regenerative fuel cells and solar cells designed depending on design variables controlled in an analyzing step (S300) of the high altitude long endurance simulation method for an unmanned aerial vehicle based on regenerative fuel cells and solar cells according to an exemplary embodiment of the present invention.

FIG. 5 is a view illustrating a flight path of an unmanned aerial vehicle in the case in which the design variables are set to the reference values. That is, FIG. 5 is a graph illustrating a flight path of an unmanned aerial vehicle based on regenerative fuel cells and solar cells in the case of setting the weight of the unmanned aerial vehicle to 350 kg, setting the wing area of the unmanned aerial vehicle to 150 m$^2$, and setting the water electrolysis performance of the regenerative fuel cells to 80 kWh/1 kg H$_2$. In this case, output power is changed depending on the weight and the wing area of the unmanned aerial vehicle, a time required for the unmanned aerial vehicle to arrive at an altitude of 18 km may be changed.

First Exemplary Embodiment

In the analyzing step (S300), the high altitude long endurance simulation for the unmanned aerial vehicle based on regenerative fuel cells and solar cells may be performed while changing only the weight of the unmanned aerial vehicle in a state in which the wing area of the unmanned aerial vehicle and the water electrolysis performance of the regenerative fuel cells are fixed to the reference values described above.

Figure 6:
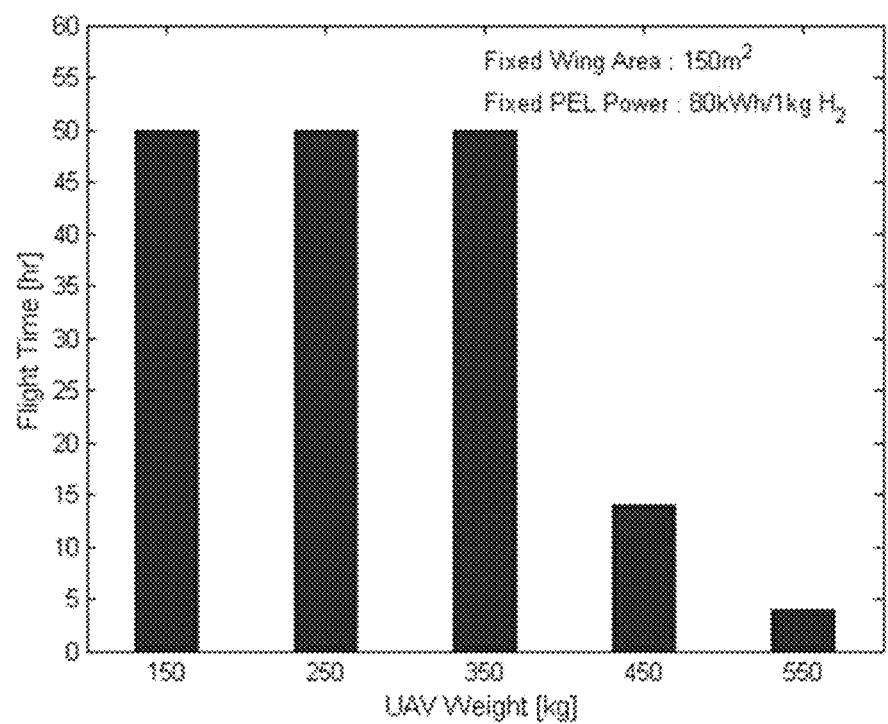
FIG. 6 is a view illustrating flight time comparison values depending on a weight of an unmanned aerial vehicle based on regenerative fuel cells and solar cells according to an exemplary embodiment of the present invention.
Figure 7:
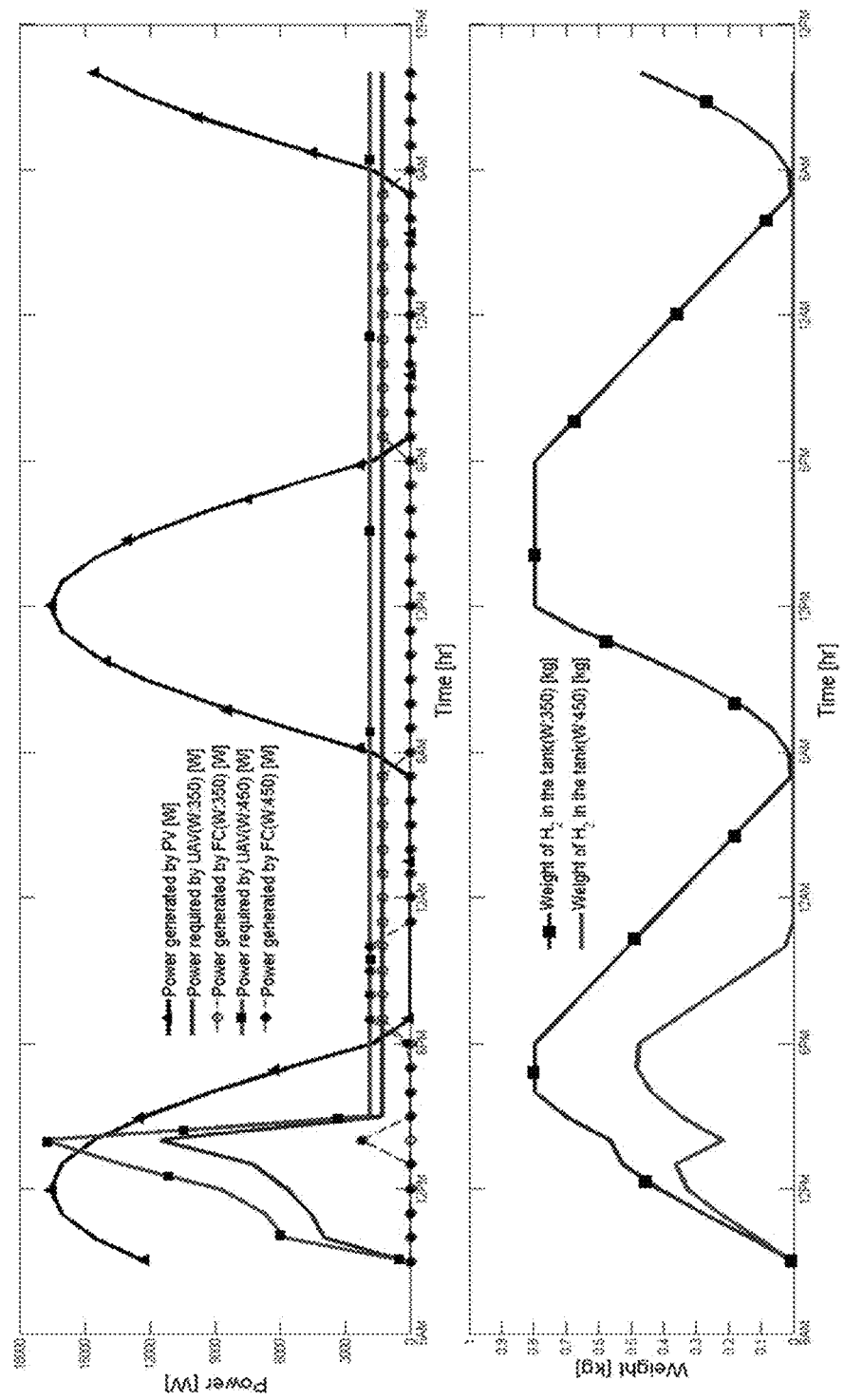
FIG. 7 is views illustrating amounts of hydrogen and output power depending on a time when a wing area and water electrolysis performance of an unmanned aerial vehicle are fixed to reference values and only a weight of the unmanned aerial vehicle is changed in the analyzing step (S300) of the high altitude long endurance simulation method for an unmanned aerial vehicle based on regenerative fuel cells and solar cells according to an exemplary embodiment of the present invention.

FIGS. 6 and 7, which illustrate high altitude long endurance simulation result values for an unmanned aerial vehicle based on regenerative fuel cells and solar cells when the wing area of the unmanned aerial vehicle and the water electrolysis performance of the regenerative fuel cells are fixed to the reference values described above and only the weight of the unmanned aerial vehicle is changed, are graphs illustrating a flight time of the unmanned aerial vehicle based on regenerative fuel cells and solar cells and amounts of hydrogen and output power depending on a time.

In detail, in the case in which the wing area of the unmanned aerial vehicle and the water electrolysis performance of the regenerative fuel cells are fixed to the reference values described above, long endurance of the unmanned aerial vehicle is possible at a weight of the unmanned aerial vehicle up to 350 kg, as illustrated in FIG. 6. On the contrary, in the case in which the weight of the unmanned aerial vehicle is 450 kg and 550 kg, since required output power of the unmanned aerial vehicle is also increased as the weight of the unmanned aerial vehicle is increased, it is impossible to generate hydrogen and oxygen that are to be used for one day while satisfying the required output power at the wing area of the unmanned aerial vehicle and the water electrolysis performance of the regenerative fuel cells fixed to the reference values, such that the long endurance of the unmanned aerial vehicle is impossible.

In addition, the weight 350 kg of the unmanned aerial vehicle of which the long endurance is possible and the weight 450 kg of the unmanned aerial vehicle of which the long endurance is impossible may be compared with each other as illustrated in FIG. 7.

As illustrated in FIG. 7, in the case in which the weight of the unmanned aerial vehicle is 350 kg, amounts of hydrogen and oxygen are not insufficient, and the required output power of the unmanned aerial vehicle is thus continuously supplied to the unmanned aerial vehicle while drawing a predetermined pattern, such that the long endurance of the unmanned aerial vehicle is possible. On the contrary, in the case in which the weight of the unmanned aerial vehicle is 450 kg, all of hydrogen and oxygen are used after take-off of the unmanned aerial vehicle and before the sun rises on the next day, and the required output power may not be thus supplied during the night, such that the long endurance of the unmanned aerial vehicle is impossible.

Second Exemplary Embodiment

In the analyzing step (S300), the high altitude long endurance simulation for the unmanned aerial vehicle based on regenerative fuel cells and solar cells may be performed while changing only the wing area of the unmanned aerial vehicle in a state in which the weight of the unmanned aerial vehicle and the water electrolysis performance of the regenerative fuel cells are fixed to the reference values described above.

Figure 8:
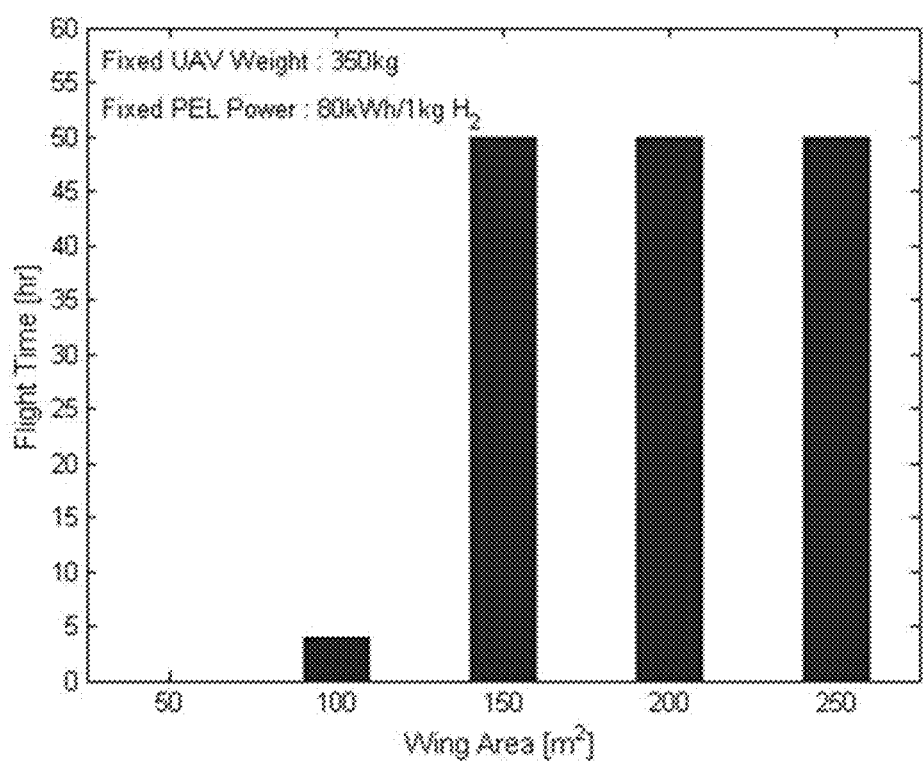
FIG. 8 is a view illustrating flight time comparison values depending on a wing area of an unmanned aerial vehicle based on regenerative fuel cells and solar cells according to an exemplary embodiment of the present invention.
Figure 9:
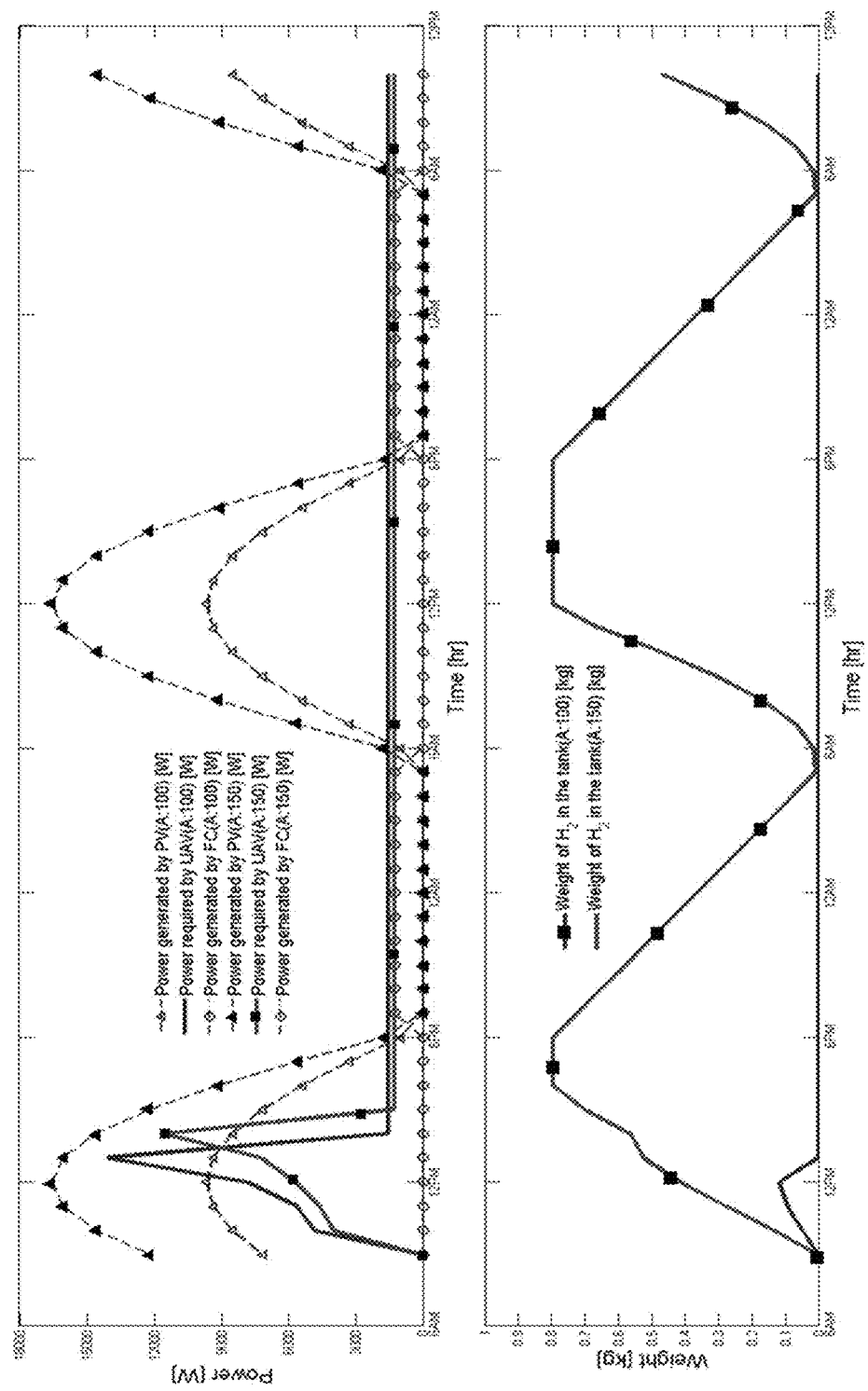
FIG. 9 is views illustrating amounts of hydrogen and output power depending on a time when a weight and water electrolysis performance of an unmanned aerial vehicle are fixed to reference values and only a wing area of the unmanned aerial vehicle is changed in the analyzing step (S300) of the high altitude long endurance simulation method for an unmanned aerial vehicle based on regenerative fuel cells and solar cells according to an exemplary embodiment of the present invention.

FIGS. 8 and 9, which illustrate high altitude long endurance simulation result values for an unmanned aerial vehicle based on regenerative fuel cells and solar cells when the weight of the unmanned aerial vehicle and the water electrolysis performance of the regenerative fuel cells are fixed to the reference values described above and only the wing area of the unmanned aerial vehicle is changed, are graphs illustrating a flight time of the unmanned aerial vehicle based on regenerative fuel cells and solar cells and amounts of hydrogen and output power depending on a time.

In detail, in the case in which the weight of the unmanned aerial vehicle and the water electrolysis performance of the regenerative fuel cells are fixed to the reference values described above, long endurance of the unmanned aerial vehicle is possible at a wing area of the unmanned aerial vehicle of 150 m² or more, as illustrated in FIG. 8. On the contrary, in the case in which the wing area of the unmanned aerial vehicle is 50 m², the wing area of the unmanned aerial vehicle is excessively small as compared with the weight of the unmanned aerial vehicle. Therefore, an area of the solar cells formed in the unmanned aerial vehicle is also small, such that the required output power of the unmanned aerial vehicle may not be satisfied. As a result, it is impossible that the unmanned aerial vehicle takes off. In addition, in the case in which the wing area of the unmanned aerial vehicle is 100 m², the unmanned aerial vehicle may take off, but surplus energy supplied to the water electrolysis system through the solar cell system is decreased, such that amounts of hydrogen and oxygen generated through the water electrolysis system are decreased. As a result, endurance of the unmanned aerial vehicle through the fuel cell system during the night is impossible.

In addition, the wing area 150 m² of the unmanned aerial vehicle of which the long endurance is possible and the wing area 100 m² of the unmanned aerial vehicle of which the long endurance is impossible may be compared with each other as illustrated in FIG. 9.

As illustrated in FIG. 9, in the case in which the wing area of the unmanned aerial vehicle is 150 m², surplus energy transferred to the water electrolysis system through the solar cell system is sufficient, such that the water electrolysis system may sufficiently generate and provide hydrogen and oxygen that are to be used in the fuel cell system during the night to supply output power required by the unmanned aerial vehicle. On the contrary, in the case in which the wing area of the unmanned aerial vehicle is 100 m², surplus energy transferred to the water electrolysis system through the solar cell system is not sufficient, such that the water electrolysis system may not sufficiently generate hydrogen and oxygen that are to be used in the fuel cell system during the night. Therefore, all of hydrogen and oxygen are used after take-off of the unmanned aerial vehicle and before the sun rises on the next day, and the required output power may not be thus supplied during the night, such that the long endurance of the unmanned aerial vehicle is impossible.

Third Exemplary Embodiment

In the analyzing step (S300), the high altitude long endurance simulation for the unmanned aerial vehicle based on regenerative fuel cells and solar cells may be performed while changing only the water electrolysis performance of the regenerative fuel cells in a state in which the weight of the unmanned aerial vehicle and the wing area of the unmanned aerial vehicle are fixed to the reference values described above.

Figure 10:
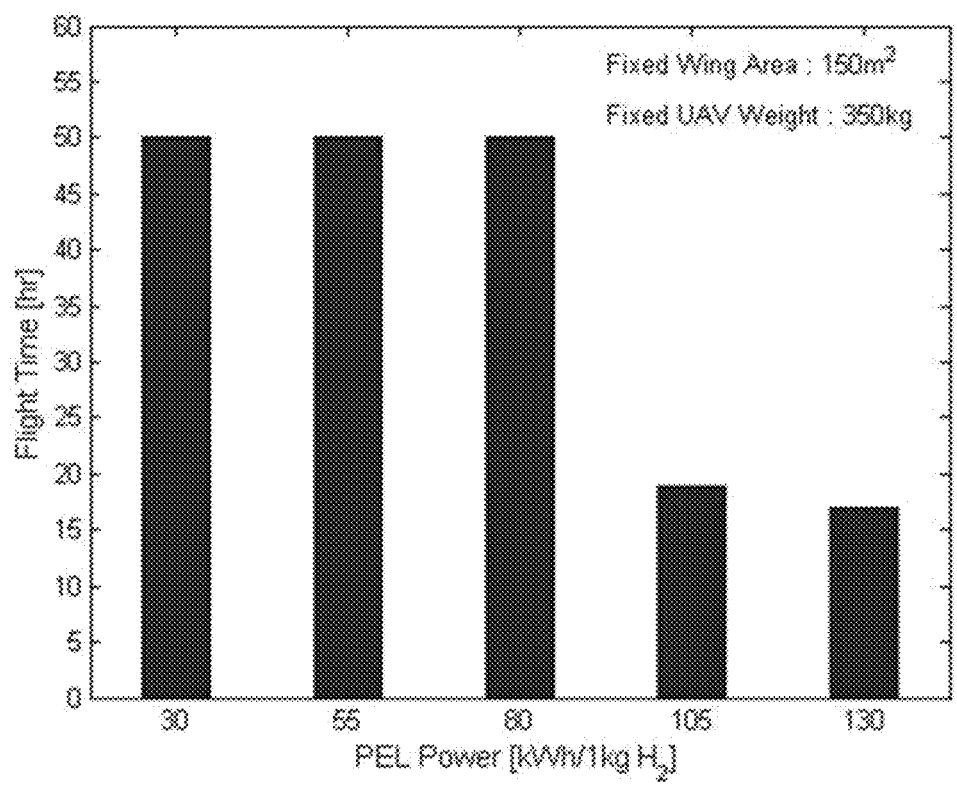
FIG. 10 is a view illustrating flight time comparison values depending on water electrolysis performance of an unmanned aerial vehicle based on regenerative fuel cells and solar cells according to an exemplary embodiment of the present invention.
Figure 11:
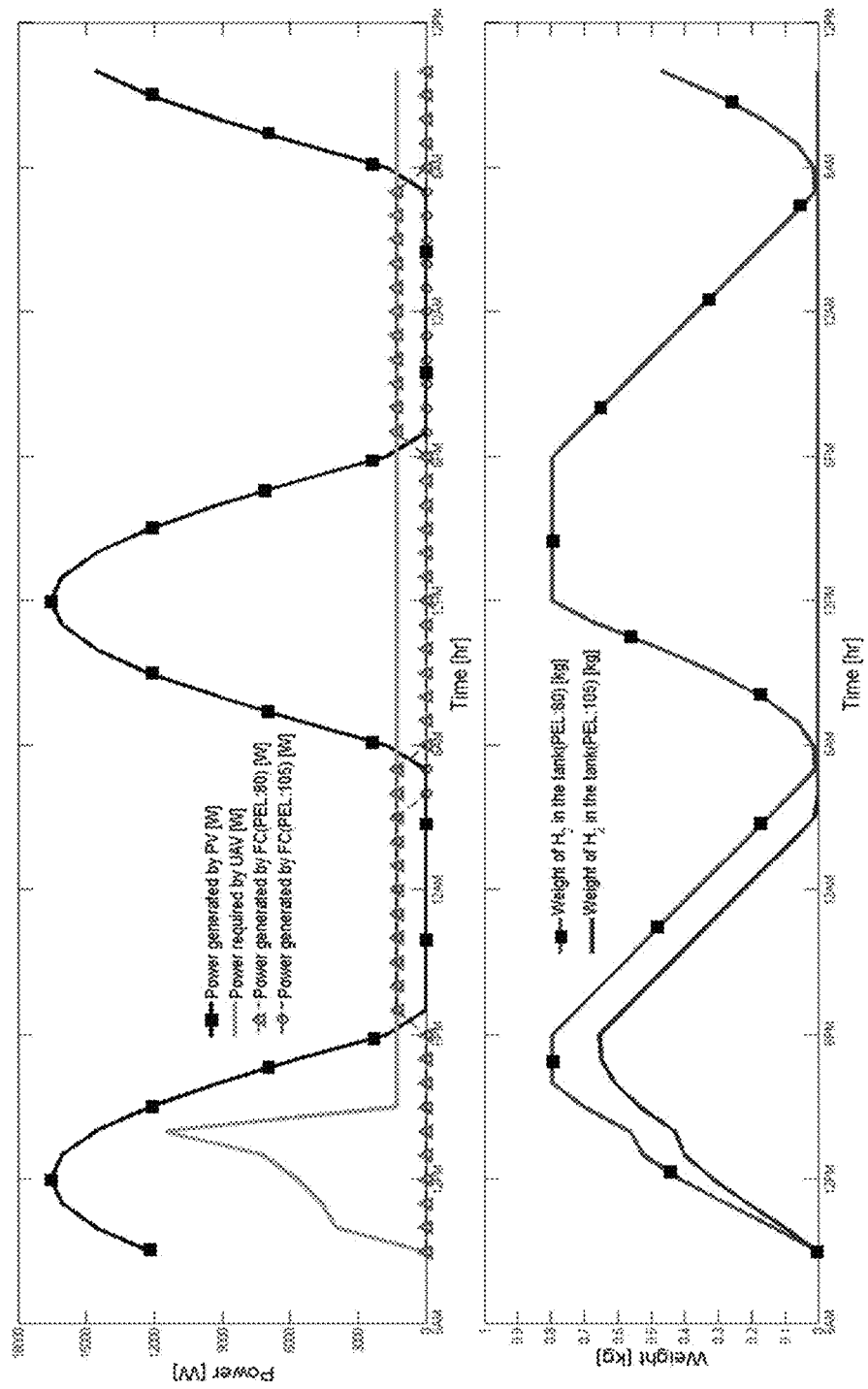
FIG. 11 is views illustrating amounts of hydrogen and output power depending on a time when a weight and a wing area of an unmanned aerial vehicle are fixed to reference values and only water electrolysis performance of the unmanned aerial vehicle is changed in the analyzing step (S300) of the high altitude long endurance simulation method for an unmanned aerial vehicle based on regenerative fuel cells and solar cells according to an exemplary embodiment of the present invention.

FIGS. 10 and 11, which illustrate high altitude long endurance simulation result values for an unmanned aerial vehicle based on regenerative fuel cells and solar cells when the weight of the unmanned aerial vehicle and the wing area of the unmanned aerial vehicle are fixed to the reference values described above and only the water electrolysis performance of the regenerative fuel cells is changed, are graphs illustrating a flight time of the unmanned aerial vehicle based on regenerative fuel cells and solar cells and amounts of hydrogen and output power depending on a time.

In detail, in the case in which the weight of the unmanned aerial vehicle and the wing area of the unmanned aerial vehicle are fixed to the reference values described above, the long endurance of the unmanned aerial vehicle is possible at water electrolysis performance of the regenerative fuel cells up to 80 kWh/1 kg $H_2$, as illustrated in FIG. 10.

However, in the case in which the water electrolysis performance of the regenerative fuel cells is 105 kWh/1 kg $H_2$ and 130 kWh/1 kg $H_2$, the long endurance of the unmanned aerial vehicle is impossible. That is, since energy required for generating hydrogen and oxygen in the water electrolysis system is excessively large, hydrogen and oxygen required for endurance of the unmanned aerial vehicle during the night may not be generated through surplus energy supplied from the solar cell system, such that the long endurance of the unmanned aerial vehicle is impossible.

In addition, the water electrolysis performance 80 kWh/1 kg $H_2$ of the regenerative fuel cells of the unmanned aerial vehicle of which the long endurance is possible and the water electrolysis performance 105 kWh/1 kg $H_2$ of the regenerative fuel cells of the unmanned aerial vehicle of which the long endurance is impossible may be compared with each other as illustrated in FIG. 11.

As illustrated in FIG. 11, in the case in which the water electrolysis performance of the regenerative fuel cells is 80 kWh/1 kg $H_2$, the water electrolysis system may sufficiently generate and provide hydrogen and oxygen that are to be consumed in the fuel cell system during the night to continuously supply output power required by the unmanned aerial vehicle, such that the long endurance of the unmanned aerial vehicle is possible. On the contrary, in the case in which the water electrolysis performance of the regenerative fuel cells is 105 kWh/1 kg $H_2$, the energy required for generating hydrogen and oxygen is excessively large as described above, such that hydrogen and oxygen that are to be used in the fuel cell system during the night may not be sufficiently generated through the surplus energy provided from the solar cell system to the water electrolysis system. Therefore, all of hydrogen and oxygen are used after take-off of the unmanned aerial vehicle and before the sun rises on the next day, and the required output power may not be thus supplied during the night, such that the long endurance of the unmanned aerial vehicle is impossible.

As described above, in the analyzing step (S300), the high altitude long endurance simulation for the unmanned aerial vehicle based on regenerative fuel cells and solar cells may be performed while controlling the weight of the unmanned aerial vehicle, the wing area of the unmanned aerial vehicle, and the water electrolysis performance of the regenerative fuel cells, which are the design variables, on the basis of the modeling result in the modeling step (S200).

The high altitude long endurance simulation method for an unmanned aerial vehicle based on regenerative fuel cells and solar cells according to an exemplary embodiment of the present invention may further include a validity verifying step (S400).

In the validity verifying step (S400), a high altitude long endurance simulation performing result for the unmanned aerial vehicle based on regenerative fuel cells and solar cells performed in the analyzing step (S300) may be analyzed to decide whether or not the high altitude long endurance of the unmanned aerial vehicle based on regenerative fuel cells and solar cells is possible.

In other words, in the high altitude long endurance simulation method for an unmanned aerial vehicle based on regenerative fuel cells and solar cells according to an exemplary embodiment of the present invention, validity investigation for whether or not a high altitude long endurance target of the unmanned aerial vehicle based on regenerative fuel cells and solar cells in the stratosphere is achieved may be performed, and high altitude long endurance simulation performing results in the case in which the respective design variables are out of the reference values are analyzed on the basis of the weight of the unmanned aerial vehicle, the wing area of the unmanned aerial vehicle, and the water electrolysis performance of the regenerative fuel cells, which are the design variables, thereby making it possible to decide whether or not the long endurance of the unmanned aerial vehicle is possible.

On the basis of the high altitude long endurance simulation method for an unmanned aerial vehicle based on regenerative fuel cells and solar cells, a flight path for the unmanned aerial vehicle may be controlled based on information measured in real time during an actual flight of the unmanned aerial vehicle.

Hereinafter, a flight control method for enabling permanent long endurance of the unmanned aerial vehicle in the stratosphere by controlling an altitude, a speed, a climb angle, a descent angle, and the like, of the unmanned aerial vehicle based on information measured in real time during a flight of the unmanned aerial vehicle in the stratosphere will be described.

Figure 12:
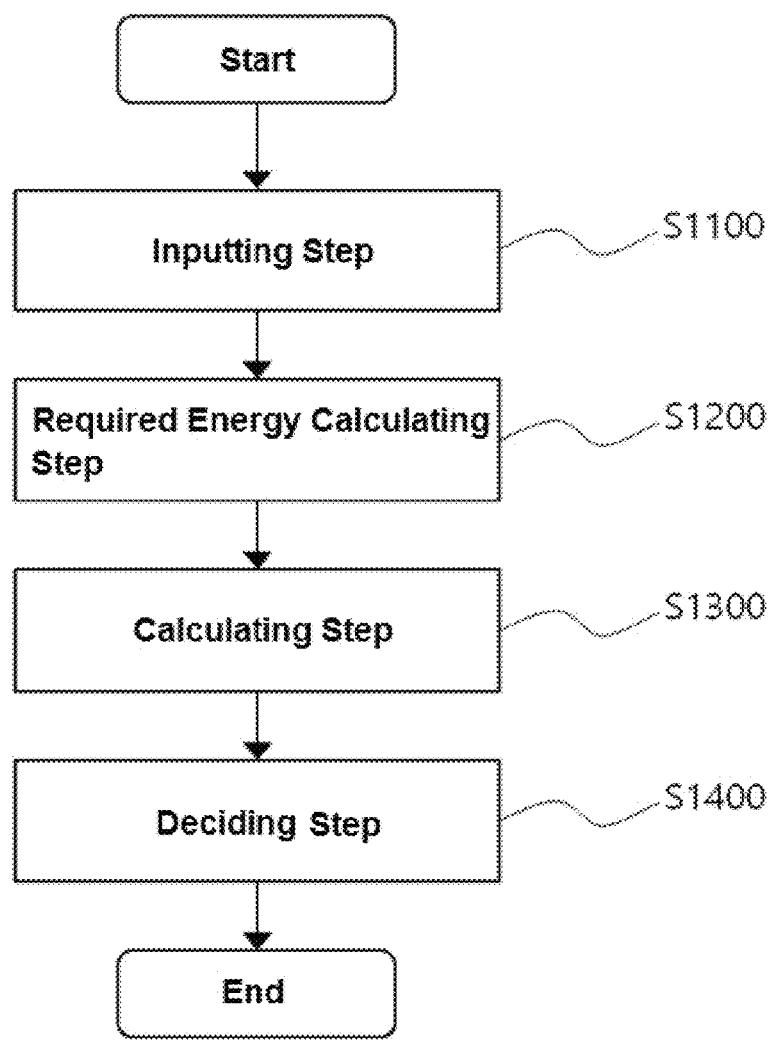
FIG. 12 is a flow chart illustrating a flight control method for high altitude long endurance of an unmanned aerial vehicle based on regenerative fuel cells and solar cells according to an exemplary embodiment of the present invention.

As illustrated in FIG. 12, a flight control method for an unmanned aerial vehicle based on regenerative fuel cells and solar cells may include an inputting step (S1100) of receiving an input for a weight and a wing area of the unmanned aerial vehicle and water electrolysis performance of the regenerative fuel cells; a required energy calculating step (S1200) of measuring a current speed and altitude of the unmanned aerial vehicle that is being flown to calculate lift force and thrust force of the unmanned aerial vehicle and drag force acting on the unmanned aerial vehicle and calculate output power and required energy of the unmanned aerial vehicle using the lift force, the thrust force, and the drag force; a calculating step (S1300) of measuring energy generated by the solar cells installed in the unmanned aerial vehicle and measuring a current cell voltage of fuel cells included in the generative fuel cells to calculate energy generated by the fuel cells, amounts of hydrogen and oxygen consumed through the fuel cells, and an amount of water generated through the fuel cells, and calculating amounts of hydrogen and oxygen generated in a water electrolyzer included in the regenerative fuel cells and an amount of water consumed through the water electrolyzer using surplus energy except the required energy supplied to the unmanned aerial vehicle in the energy generated by the solar cells; and a deciding step (S1400) of deciding whether or not energy that may be generated in the fuel cells may maintain a currently set flight control on the basis of the amounts of hydrogen and oxygen generated using the surplus energy.

In addition, the flight control method for an unmanned aerial vehicle based on regenerative fuel cells and solar cells may further include, after the deciding step (S1400), a requesting step of additionally requesting surplus energy that is to be used in the water electrolyzer in order to secure amounts of hydrogen and oxygen that are to be consumed through the fuel cells in the case in which it is decided that the energy that may be generated in the fuel cells is smaller than energy required at the time of a flight of the unmanned aerial vehicle through a currently set flight path; and an updating step of updating performance of the water electrolyzer, a speed and an altitude of the unmanned aerial vehicle, an amount of energy generated in the solar cells, and a cell voltage of the fuel cells measured depending on a flight path during a flight of the unmanned aerial vehicle.

In addition, the flight control method for an unmanned aerial vehicle based on regenerative fuel cells and solar cells may further include, after the deciding step (S1400), a changing step of changing a flight path so that the unmanned aerial vehicle may stay for the longest time by decreasing the energy generated in the fuel cells in the case in which it is decided that the energy that may be generated in the fuel cells is smaller than energy required at the time of a flight of the unmanned aerial vehicle through a currently set flight path; and an updating step of updating performance of the water electrolyzer, a speed and an altitude of the unmanned aerial vehicle, an amount of energy generated in the solar cells, and a cell voltage of the fuel cells measured depending on the flight path during a flight of the unmanned aerial vehicle.

In the changing step, the flight path may be changed by changing any one or more of an altitude, a speed, a climb angle, and a descent angle of the unmanned aerial vehicle.

In addition, the flight path may be any one of a first flight path through which the unmanned aerial vehicle performs a level flight during the night and performs a glide flight after a climb flight during the daytime, a second flight path through which the unmanned aerial vehicle performs a level flight during the night and performs a climb flight after a glide flight during the daytime, a third flight path through which the unmanned aerial vehicle performs a glide flight after a climb flight during the night and performs a level flight during the daytime, and a fourth flight path through which the unmanned aerial vehicle performs a climb flight after a glide flight during the night and performs a level flight during the daytime.

The methods described above may be recorded in a recording medium in which a program that is to be executed in a computer is recorded.

In a recording medium in which a program for executing a flight control method for an unmanned aerial vehicle based on regenerative fuel cells and solar cells in a computer is recorded, the flight control method for an unmanned aerial vehicle based on regenerative fuel cells and solar cells may include an inputting step of receiving an input for a weight and a wing area of the unmanned aerial vehicle and water electrolysis performance of the regenerative fuel cells; a required energy calculating step of measuring a current speed and altitude of the unmanned aerial vehicle that is being flown to calculate lift force and thrust force of the unmanned aerial vehicle and drag force acting on the unmanned aerial vehicle and calculate output power and required energy of the unmanned aerial vehicle using the lift force, the thrust force, and the drag force; a calculating step of measuring energy generated by the solar cells installed in the unmanned aerial vehicle and measuring a current cell voltage of fuel cells included in the generative fuel cells to calculate energy generated by the fuel cells, amounts of hydrogen and oxygen consumed through the fuel cells, and an amount of water generated through the fuel cells, and calculating amounts of hydrogen and oxygen generated in a water electrolyzer included in the regenerative fuel cells and an amount of water consumed through the water electrolyzer using surplus energy except the required energy supplied to the unmanned aerial vehicle in the energy generated by the solar cells; and a deciding step of deciding whether or not energy that may be generated in the fuel cells may maintain a currently set flight control on the basis of the amounts of hydrogen and oxygen generated using the surplus energy.

In addition, the recording medium may include all of the features of the flight control method for an unmanned aerial vehicle based on regenerative fuel cells and solar cells described above.

The unmanned aerial vehicle based on regenerative fuel cells and solar cells may include a flight control apparatus capable of performing a flight control on the basis of information measured in real time during an actual flight of the unmanned aerial vehicle.

Hereinafter, a flight control apparatus for continuously performing a flight control on the basis of information measured in real time during a flight of the unmanned aerial vehicle in the stratosphere so that the unmanned aerial vehicle may permanently perform long endurance in the stratosphere will be described.

Figure 13:
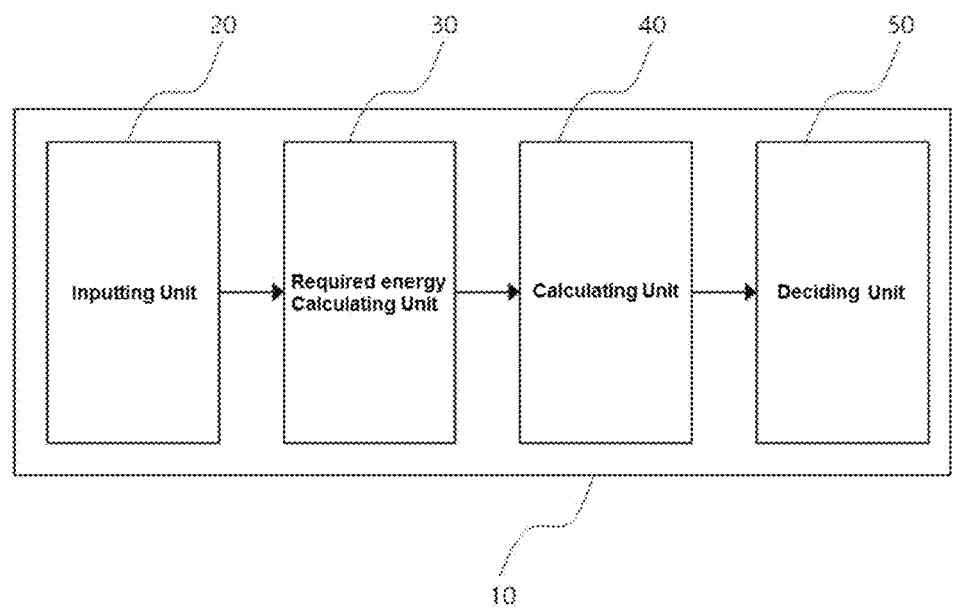
FIG. 13 is a schematic view illustrating a flight control apparatus for high altitude long endurance of an unmanned aerial vehicle based on regenerative fuel cells and solar cells according to an exemplary embodiment of the present invention.

As illustrated in FIG. 13, a flight control apparatus 10 for an unmanned aerial vehicle based on regenerative fuel cells and solar cells may include an inputting unit 20 of receiving an input for a weight and a wing area of the unmanned aerial vehicle and water electrolysis performance of the regenerative fuel cells; a required energy calculating unit 30 of measuring a current speed and altitude of the unmanned aerial vehicle that is being flown to calculate lift force and thrust force of the unmanned aerial vehicle and drag force acting on the unmanned aerial vehicle and calculate output power and required energy of the unmanned aerial vehicle using the lift force, the thrust force, and the drag force; a calculating unit 40 of measuring energy generated by the solar cells installed in the unmanned aerial vehicle and measuring a current cell voltage of fuel cells included in the generative fuel cells to calculate energy generated by the fuel cells, amounts of hydrogen and oxygen consumed through the fuel cells, and an amount of water generated through the fuel cells, and calculating amounts of hydrogen and oxygen generated in a water electrolyzer included in the regenerative fuel cells and an amount of water consumed through the water electrolyzer using surplus energy except the required energy supplied to the unmanned aerial vehicle in the energy generated by the solar cells; and a deciding unit 50 of deciding whether or not energy that may be generated in the fuel cells may maintain a currently set flight control on the basis of the amounts of hydrogen and oxygen generated using the surplus energy.

In addition, the flight control apparatus 10 for an unmanned aerial vehicle based on regenerative fuel cells and solar cells may further include a requesting unit of additionally requesting surplus energy that is to be used in the water electrolyzer in order to secure amounts of hydrogen and oxygen that are to be consumed through the fuel cells in the case in which it is decided that the energy that may be generated in the fuel cells is smaller than energy required at the time of a flight of the unmanned aerial vehicle through a currently set flight path; and an updating unit of updating performance of the water electrolyzer, a speed and an altitude of the unmanned aerial vehicle, an amount of energy generated in the solar cells, and a cell voltage of the fuel cells measured depending on a flight path during a flight of the unmanned aerial vehicle.

In addition, the flight control apparatus 10 for an unmanned aerial vehicle based on regenerative fuel cells and solar cells may further include a changing unit of changing a flight path so that the unmanned aerial vehicle may stay for the longest time by decreasing the energy generated in the fuel cells in the case in which it is decided that the energy that may be generated in the fuel cells is smaller than energy required at the time of a flight of the unmanned aerial vehicle through a currently set flight path; and an updating unit of updating performance of the water electrolyzer, a speed and an altitude of the unmanned aerial vehicle, an amount of energy generated in the solar cells, and a cell voltage of the fuel cells measured depending on the flight path during a flight of the unmanned aerial vehicle.

In the changing unit, the flight path may be changed by changing any one or more of an altitude, a speed, a climb angle, and a descent angle of the unmanned aerial vehicle.

In addition, the flight path may be any one of a first flight path through which the unmanned aerial vehicle performs a level flight during the night and performs a glide flight after a climb flight during the daytime, a second flight path through which the unmanned aerial vehicle performs a level flight during the night and performs a climb flight after a glide flight during the daytime, a third flight path through which the unmanned aerial vehicle performs a glide flight after a climb flight during the night and performs a level flight during the daytime, and a fourth flight path through which the unmanned aerial vehicle performs a climb flight after a glide flight during the night and performs a level flight during the daytime.

Figure 14:
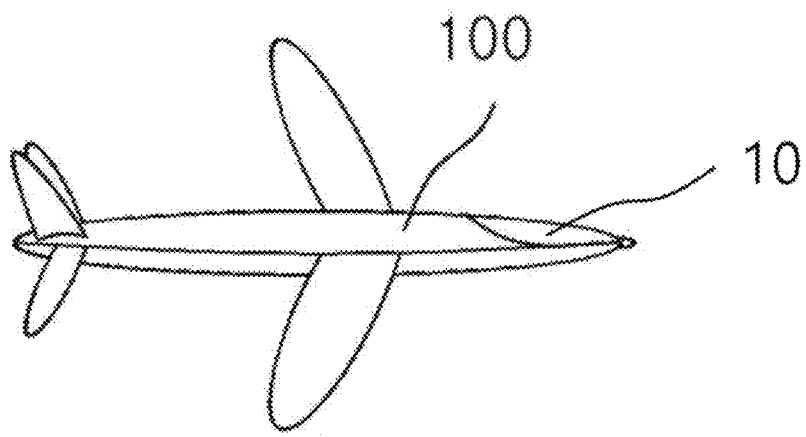
FIG. 14 is a schematic view illustrating an unmanned aerial vehicle including the flight control apparatus for high altitude long endurance of an unmanned aerial vehicle based on regenerative fuel cells and solar cells according to an exemplary embodiment of the present invention.

As illustrated in FIG. 14, the flight control apparatus 10 for an unmanned aerial vehicle based on regenerative fuel cells and solar cells may be included in an aircraft 100. The aircraft may include an unmanned aerial vehicle, a manned aerial vehicle, and a spacecraft.

In this case, the flight control apparatus may include all of the features of the flight control apparatus for an unmanned aerial vehicle based on regenerative fuel cells and solar cells described above.

In the high altitude long endurance simulation method for an unmanned aerial vehicle based on regenerative fuel cells and solar cells according to an exemplary embodiment of the present invention having the configuration as described above, in order to search a target value of a technical level for achieving high altitude long endurance of the unmanned aerial vehicle, specific design variables having an influence on endurance capacitance of the unmanned aerial vehicle are set, and a simulation is performed while controlling the respective specific design variables to analyze influences of the design variables on a flight time, thereby making it possible to provide target values of the design variables required for a long endurance operation.

Hereinabove, although the present invention has been described by specific matters such as detailed components, exemplary embodiments, and the accompanying drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

What is claimed is:

1. A high altitude long endurance simulation method for an unmanned aerial vehicle based on regenerative fuel cells and solar cells, configured in a program form executed by an arithmetic processing means including a computer, comprising:
a variable inputting step of inputting specific design variables of the unmanned aerial vehicle based on regenerative fuel cells and solar cells;
a modeling step of performing modeling of the unmanned aerial vehicle based on regenerative fuel cells and solar cells through pre-set correlation equations using the specific design variables input in the variable inputting step and pre-stored design variables;
an analyzing step of analyzing a modeling result in the modeling step to perform a high altitude long endurance simulation while controlling two design variables selected from the specific design variables input in the variable inputting step to be fixed and controlling the other one design variable to be changed; and
a validity verifying step of analyzing a result of the high altitude long endurance simulation for the unmanned aerial vehicle based on regenerative fuel cells and solar cells performed in the analyzing step to decide whether or not high altitude long endurance of the unmanned aerial vehicle based on regenerative fuel cells and solar cells is possible under the control in the analyzing step.

2. The high altitude long endurance simulation method for the unmanned aerial vehicle based on regenerative fuel cells and solar cells of claim 1, wherein in the variable inputting step, a weight of the unmanned aerial vehicle, a wing area of the unmanned aerial vehicle, and water electrolysis performance of the regenerative fuel cells are included and set as the specific design variables of the unmanned aerial vehicle based on regenerative fuel cells and solar cells.

3. The high altitude long endurance simulation method for the unmanned aerial vehicle based on regenerative fuel cells and solar cells of claim 2, wherein in the modeling step, the modeling of the unmanned aerial vehicle based on regenerative fuel cells and solar cells is performed, through correlation equations set by correlations between design variables including the specific design variables and the regenerative fuel cells and solar cells, using the specific design variables input in the variable inputting step and the pre-stored design variables, so as to calculate output power required energy of the unmanned aerial vehicle, output power of the solar cells, energy generated by the solar cells, output power of fuel cells included in the regenerative fuel cells, energy generated by the fuel cells included in the regenerative fuel cells, amounts of hydrogen and oxygen consumed through the fuel cells included in the regenerative fuel cells, an amount of water generated through the fuel cells included in the regenerative fuel cells, output power of a water electrolyzer included in the regenerative fuel cells and energy generated by the water electrolyzer included in the regenerative fuel cells, amounts of hydrogen and oxygen generated through the water electrolyzer included in the regenerative fuel cells, and an amount of water consumed through the water electrolyzer included in the regenerative fuel cells.

4. A flight control method for an unmanned aerial vehicle based on regenerative fuel cells and solar cells, comprising:
an inputting step of receiving an input for a weight and a wing area of the unmanned aerial vehicle and water electrolysis performance of the regenerative fuel cells;
a required energy calculating step of measuring a current speed and altitude of the unmanned aerial vehicle that is being flown to calculate lift force and thrust force of the unmanned aerial vehicle and drag force acting on the unmanned aerial vehicle and calculate output power and required energy of the unmanned aerial vehicle using the lift force, the thrust force, and the drag force;
a calculating step of measuring energy generated by the solar cells installed in the unmanned aerial vehicle and measuring a current cell voltage of fuel cells included in the regenerative fuel cells to calculate energy generated by the fuel cells, amounts of hydrogen and oxygen consumed through the fuel cells, and an amount of water generated through the fuel cells, and calculating amounts of hydrogen and oxygen generated in a water electrolyzer included in the regenerative fuel cells and an amount of water consumed through the water electrolyzer using surplus energy except the required energy supplied to the unmanned aerial vehicle in the energy generated by the solar cells; and
a deciding step of deciding whether or not energy that is generated in the fuel cells maintains a currently set flight control on the basis of the amounts of hydrogen and oxygen generated using the surplus energy.

5. The flight control method for the unmanned aerial vehicle based on regenerative fuel cells and solar cells of claim 4, further comprising a requesting step of additionally requesting surplus energy that is to be used in the water electrolyzer in order to secure amounts of hydrogen and oxygen that are to be consumed through the fuel cells in the case in which it is decided that the energy that is generated in the fuel cells is less than energy required at the time of a flight of the unmanned aerial vehicle through a currently set flight path.

6. The flight control method for the unmanned aerial vehicle based on regenerative fuel cells and solar cells of claim 5, further comprising, after the requesting step of additionally requesting the surplus energy, an updating step of updating performance of the water electrolyzer, a speed and an altitude of the unmanned aerial vehicle, an amount of energy generated in the solar cells, and a cell voltage of the fuel cells measured depending on the flight path during a flight of the unmanned aerial vehicle.

7. The flight control method for the unmanned aerial vehicle based on regenerative fuel cells and solar cells of claim 4, further comprising a changing step of changing a flight path so that the unmanned aerial vehicle stays for the longest time by decreasing the energy generated in the fuel cells in the case in which it is decided that the energy that is generated in the fuel cells is less than energy required at the time of a flight of the unmanned aerial vehicle through a currently set flight path.

8. The flight control method for the unmanned aerial vehicle based on regenerative fuel cells and solar cells of claim 7, further comprising, after the changing step of changing the flight path, an updating step of updating performance of the water electrolyzer, a speed and an altitude of the unmanned aerial vehicle, an amount of energy generated in the solar cells, and a cell voltage of the fuel cells measured depending on the flight path during the flight of the unmanned aerial vehicle.

9. The flight control method for the unmanned aerial vehicle based on regenerative fuel cells and solar cells of claim 7, wherein the flight path is changed by changing any one or more of an altitude, a speed, a climb angle, and a descent angle of the unmanned aerial vehicle.

10. The flight control method for the unmanned aerial vehicle based on regenerative fuel cells and solar cells of claim 7, wherein the flight path is any one of a first flight path through which the unmanned aerial vehicle performs a level flight during the night and performs a glide flight after a climb flight during the daytime, a second flight path through which the unmanned aerial vehicle performs a level flight during the night and performs a climb flight after a glide flight during the daytime, a third flight path through which the unmanned aerial vehicle performs a glide flight after a climb flight during the night and performs a level flight during the daytime, and a fourth flight path through which the unmanned aerial vehicle performs a climb flight after a glide flight during the night and performs a level flight during the daytime.

11. A flight control apparatus for an unmanned aerial vehicle based on regenerative fuel cells and solar cells, comprising:
an inputting unit of receiving an input for a weight and a wing area of the unmanned aerial vehicle and water electrolysis performance of the regenerative fuel cells;
a required energy calculating unit of measuring a current speed and altitude of the unmanned aerial vehicle that is being flown to calculate lift force and thrust force of the unmanned aerial vehicle and drag force acting on the unmanned aerial vehicle and calculate output power and required energy of the unmanned aerial vehicle using the lift force, the thrust force, and the drag force;
a calculating unit of measuring energy generated by the solar cells installed in the unmanned aerial vehicle and measuring a current cell voltage of fuel cells included in the regenerative fuel cells to calculate energy generated by the fuel cells, amounts of hydrogen and oxygen consumed through the fuel cells, and an amount of water generated through the fuel cells, and calculating amounts of hydrogen and oxygen generated in a water electrolyzer included in the regenerative fuel cells and an amount of water consumed through the water electrolyzer using surplus energy except the required energy supplied to the unmanned aerial vehicle in the energy generated by the solar cells; and
a deciding unit of deciding whether or not energy that is generated in the fuel cells maintains a currently set flight control on the basis of the amounts of hydrogen and oxygen generated using the surplus energy.

12. The flight control apparatus for the unmanned aerial vehicle based on regenerative fuel cells and solar cells of claim 11, further comprising a requesting unit of additionally requesting surplus energy that is to be used in the water electrolyzer in order to secure amounts of hydrogen and oxygen that are to be consumed through the fuel cells in the case in which it is decided that the energy that is generated in the fuel cells is less than energy required at the time of a flight of the unmanned aerial vehicle through a currently set flight path.

13. The flight control apparatus for the unmanned aerial vehicle based on regenerative fuel cells and solar cells of claim 12, further comprising an updating unit of updating performance of the water electrolyzer, a speed and an altitude of the unmanned aerial vehicle, an amount of energy generated in the solar cells, and a cell voltage of the fuel cells measured depending on a flight path during a flight of the unmanned aerial vehicle after the surplus energy is additionally requested.

14. The flight control apparatus for the unmanned aerial vehicle based on regenerative fuel cells and solar cells of claim 11, further comprising a changing unit of changing a flight path so that the unmanned aerial vehicle stays for the longest time by decreasing the energy generated in the fuel cells in the case in which it is decided that the energy that is generated in the fuel cells is smaller than energy required at the time of a flight of the unmanned aerial vehicle through a currently set flight path.

15. The flight control apparatus for the unmanned aerial vehicle based on regenerative fuel cells and solar cells of claim 14, further comprising an updating unit of updating performance of the water electrolyzer, a speed and an altitude of the unmanned aerial vehicle, an amount of energy generated in the solar cells, and a cell voltage of the fuel cells measured depending on the flight path during a flight of the unmanned aerial vehicle after the flight path is changed.

16. The flight control apparatus for the unmanned aerial vehicle based on regenerative fuel cells and solar cells of claim 14, wherein the flight path is changed by changing any one or more of an altitude, a speed, a climb angle, and a descent angle of the unmanned aerial vehicle.

17. The flight control apparatus for the unmanned aerial vehicle based on regenerative fuel cells and solar cells of claim 14, wherein the flight path is any one of a first flight path through which the unmanned aerial vehicle performs a level flight during the night and performs a glide flight after a climb flight during the daytime, a second flight path through which the unmanned aerial vehicle performs a level flight during the night and performs a climb flight after a glide flight during the daytime, a third flight path through which the unmanned aerial vehicle performs a glide flight after a climb flight during the night and performs a level flight during the daytime, and a fourth flight path through which the unmanned aerial vehicle performs a climb flight after a glide flight during the night and performs a level flight during the daytime.

* * * * *